United States Patent
Sakurai

(10) Patent No.: US 9,575,914 B2
(45) Date of Patent: Feb. 21, 2017

(54) INFORMATION PROCESSING APPARATUS AND BUS CONTROL METHOD

(71) Applicant: FUJITSU LIMITED, Kawasaki-shi, Kanagawa (JP)

(72) Inventor: Hiroshi Sakurai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/656,804

(22) Filed: Mar. 13, 2015

(65) Prior Publication Data

US 2015/0339246 A1 Nov. 26, 2015

(30) Foreign Application Priority Data

May 20, 2014 (JP) .................. 2014-104264

(51) Int. Cl.
| | |
|---|---|
| *G06F 13/00* | (2006.01) |
| *G06F 13/28* | (2006.01) |
| *G06F 13/40* | (2006.01) |
| *G06F 12/00* | (2006.01) |
| *G06F 13/42* | (2006.01) |

(52) U.S. Cl.
CPC ............... *G06F 13/28* (2013.01); *G06F 12/00* (2013.01); *G06F 13/404* (2013.01); *G06F 13/4022* (2013.01); *G06F 13/4234* (2013.01); *G06F 2213/0026* (2013.01)

(58) Field of Classification Search
CPC .................. G06F 12/0246; G06F 2212/7201; G06F 13/404; G06F 13/4022; G06F 13/4234; G06F 13/28; G06F 13/126
See application file for complete search history.

(56) References Cited

U.S. PATENT DOCUMENTS

| | | |
|---|---|---|
| 6,021,455 A | 2/2000 | Kondo |
| 6,523,077 B1 | 2/2003 | Kusaka |
| 2002/0169906 A1 | 11/2002 | Kondo |
| 2013/0054928 A1* | 2/2013 | Im ....................... G06F 12/0246 711/170 |

FOREIGN PATENT DOCUMENTS

| | | |
|---|---|---|
| JP | 9-73430 | 3/1997 |
| JP | 2000-207348 | 7/2000 |

* cited by examiner

*Primary Examiner* — Ernest Unelus
(74) *Attorney, Agent, or Firm* — Staas & Halsey LLP

(57) ABSTRACT

An information processing apparatus includes: a plurality of memories; a plurality of buses each connected to each of the memories; an input/output device configured to make access to the plurality of memories; a processing unit configured to alter a mapping of a logical address and a physical address of a memory area used by the input/output device; and a switch configured to transfer access from the input/output device to any one of the plurality of buses based on the mapping, whereby the performance deterioration due to bus conflict is suppressed.

6 Claims, 29 Drawing Sheets

FIG. 2A

| INTENDED USE | LOGICAL SPACE | PHYSICAL SPACE |
|---|---|---|
| A (CPU MEMORY SPACE) | 0–0ExxxFFFFF | 0–0ExxxFFFFF (MEMORY #1) NO ACCESS CONFLICT |
| B (DISPLAY CARD DMA) PCIe#4 | 0Fxxx00000–0FxxxFFFFF | 2Fxxx0000–2FxxxFFFFF (MEMORY #3) NO ACCESS CONFLICT |
| C (RAID CARD DMA) PCIe#1 | 10xxx00000–10xxx3FFFF | 10xxx00000–10xxx3FFFF (MEMORY #2) NO ACCESS CONFLICT |
| D (LAN CARD DMA) PCIe#2 | 10xxx40000–10xxx7FFFF | 30xxx40000–30xxx7FFFF (MEMORY #4) NO ACCESS CONFLICT |

FIG. 3A

| INTENDED USE | LOGICAL SPACE | PHYSICAL SPACE |
|---|---|---|
| A (CPU MEMORY SPACE) | 0–0ExxxFFFFF | 0–0ExxxFFFFF (MEMORY #1) NO ACCESS CONFLICT |
| B (DISPLAY CARD DMA) PCIe#4 | 0Fxxx00000–0FxxxFFFFF | 2Fxxx0000–2FxxxFFFFF (MEMORY #3) NO ACCESS CONFLICT |
| C (RAID CARD DMA) PCIe#1 | 10xxx00000–10xxx3FFFF | 10xxx00000–10xxx3FFFF (MEMORY #2) NO ACCESS CONFLICT |
| D (LAN CARD DMA) PCIe#2 | 10xxx40000–10xxx7FFFF | 30xxx40000–30xxx7FFFF (MEMORY #4) NO ACCESS CONFLICT |

FIG. 4A

| INTENDED USE | LOGICAL SPACE | PHYSICAL SPACE | STATISTICAL INFORMATION |
|---|---|---|---|
| A (CPU MEMORY SPACE) | 0–0ExxxFFFFF | 0–0ExxxFFFFF (MEMORY #1) NO ACCESS CONFLICT | ACCESS FREQUENCY 40 AVERAGE OCCUPATION RATIO 20% AVERAGE TRANSFER RATE 3 G |
| B (DISPLAY CARD DMA) PCIe#4 | 0Fxxx00000–0FxxxFFFFF | 2Fxxx0000–2FxxxFFFFF (MEMORY #3) NO ACCESS CONFLICT | ACCESS FREQUENCY 30 AVERAGE OCCUPATION RATIO 20% AVERAGE TRANSFER RATE 1 G |
| C (RAID CARD DMA) PCIe#1 | 10xxx00000–10xxx3FFFF | 10xxx00000–10xxx3FFFF (MEMORY #2) ACCESS CONFLICT WITH E MINIMUM CONFLICT | ACCESS FREQUENCY 30 AVERAGE OCCUPATION RATIO 20% AVERAGE TRANSFER RATE 0.5 G |
| D (LAN CARD DMA) PCIe#2 | 10xxx40000–10xxx7FFFF | 30xxx40000–30xxx7FFFF (MEMORY #4) NO ACCESS CONFLICT | ACCESS FREQUENCY 30 AVERAGE OCCUPATION RATIO 30% AVERAGE TRANSFER RATE 2 G |
| E (USB CARD DMA) PCIe#3 | 10xxx80000–10xxxDFFFF | 10xxx80000–10xxxDFFFF (MEMORY #2) ACCESS CONFLICT WITH C MINIMUM CONFLICT | ACCESS FREQUENCY 10 AVERAGE OCCUPATION RATIO 10% AVERAGE TRANSFER RATE 0.3 G |

FIG. 5

| DESTINATION | SOURCE | DEVICE PATH | TURN LIST | CONDITION |
|---|---|---|---|---|
| MEM#1, #2, #3, #4 | PCIe#1 | Root Complex<br>PCIe BUS Switch | 3<br>2 | ADDRESSES OTHER THAN STARTING/ENDING ADDRESSES OF TRANSLATION FOR MEMORIES #1, #2, #3 AND #4 |
| MEM#1 | PCIe#1 | PCIe#A<br>PCIe BUS Switch | 0<br>2 | STARTING/ENDING ADDRESSES OF TRANSLATION FOR MEMORY #1 |
| MEM#2 | PCIe#1 | PCIe#B<br>PCIe BUS Switch | 0<br>2 | STARTING/ENDING ADDRESSES OF TRANSLATION FOR MEMORY #2 |
| MEM#3 | PCIe#1 | PCIe#C<br>PCIe BUS Switch | 0<br>2 | STARTING/ENDING ADDRESSES OF TRANSLATION FOR MEMORY #3 |
| MEM#4 | PCIe#1 | PCIe#D<br>PCIe BUS Switch | 0<br>2 | STARTING/ENDING ADDRESSES OF TRANSLATION FOR MEMORY #4 |
| ... | ... | ... | ... | ... |
| MEM#1, #2, #3, #4 | PCIe#L | Root Complex<br>PCIe BUS Switch | 3<br>2 | ADDRESSES OTHER THAN STARTING/ENDING ADDRESSES OF TRANSLATION FOR MEMORIES #1, #2, #3 AND #4 |
| MEM#1 | PCIe#L | PCIe#A<br>PCIe BUS Switch | 0<br>2 | STARTING/ENDING ADDRESSES OF TRANSLATION FOR MEMORY #1 |
| MEM#2 | PCIe#L | PCIe#B<br>PCIe BUS Switch | 0<br>2 | STARTING/ENDING ADDRESSES OF TRANSLATION FOR MEMORY #2 |
| MEM#3 | PCIe#L | PCIe#C<br>PCIe BUS Switch | 0<br>2 | STARTING/ENDING ADDRESSES OF TRANSLATION FOR MEMORY #3 |
| MEM#4 | PCIe#L | PCIe#D<br>PCIe BUS Switch | 0<br>2 | STARTING/ENDING ADDRESSES OF TRANSLATION FOR MEMORY #4 |

| INPUT | | | OUTPUT |
|---|---|---|---|
| A33 | A33_cnt_AM | Mirror_AM | A33X |
| 0 | 0 | 0 | 0 |
| 0 | 1 | 0 | 1 |
| 1 | 0 | 0 | 1 |
| 1 | 1 | 0 | 0 |
| 0 | 0 | 1 | 0 |
| 0 | 1 | 1 | 0 |
| 1 | 0 | 1 | 0 |
| 1 | 1 | 1 | 0 |

FIG. 8

| Conflict#NInput | | OUTPUT/INPUT | | | |
|---|---|---|---|---|---|
| A33X | A32X | Sel#4 | Sel#3 | Sel#2 | Sel#1 |
| 0 | 0 | 1 | 1 | 1 | 0 |
| 0 | 1 | 1 | 1 | 0 | 1 |
| 1 | 0 | 1 | 0 | 1 | 1 |
| 1 | 1 | 0 | 1 | 1 | 1 |

FIG. 9

| MG#X_AM | R/XW | MD00-63#X | D00-63 |
|---|---|---|---|
| 0 | 1 | MD00-63 | MD00-63 |
| 0 | 0 | D00-63 | D00-63 |
| 1 | X | Z | Z |

FIG. 11

| INPUT | | | | | | C | OUTPUT | | |
|---|---|---|---|---|---|---|---|---|---|
| A1 | A2 | A3 | B1 | B2 | B3 | A/B | X1 | X2 | X3 |
| A1 | A2 | A3 | B1 | B2 | B3 | 0 | B1 | B2 | B3 |
| A1 | A2 | A3 | B1 | B2 | B3 | 1 | A1 | A2 | A3 |

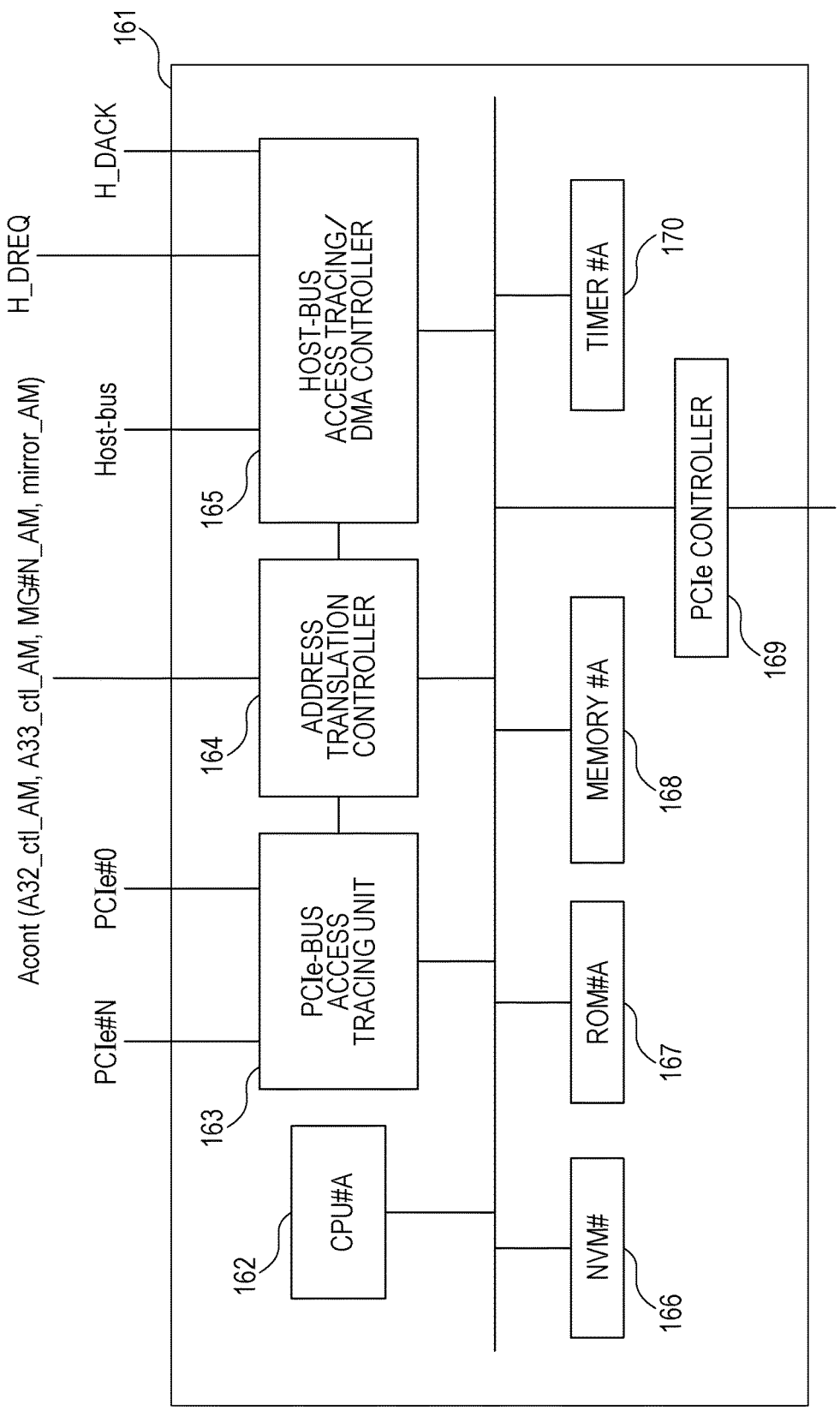

FIG. 13A

```
CONFIGURATION INFORMATION OF NVM#A
  <MEMORY-MOUNTED INFORMATION>
  PHYSICAL Address OF MEMORY #1: 000000000-00FFFFFFFF h OCCUPATION CAPACITY: 4 GB
  PHYSICAL Address OF MEMORY #2: 100000000-01FFFFFFFF h OCCUPATION CAPACITY: 4 GB
  PHYSICAL Address OF MEMORY #3: 200000000-02FFFFFFFF h OCCUPATION CAPACITY: 4 GB
  PHYSICAL Address OF MEMORY #4: 300000000-03FFFFFFFF h OCCUPATION CAPACITY: 4 GB
  <PCIe-MOUNTED INFORMATION>
  PCIe#0   Root Complex BUS
  PCIe#1   RAID Controller
  PCIe#2   LAN Controller
  PCIe#3   USB Controller
  PCIe#4   Graphic Controller
  PCIe#5   M/B I/O Controller
  PCIe#6   Access management Controller
  PCIe#A   MEM#1 Pass Controller
  PCIe#B   MEM#2 Pass Controller
  PCIe#C   MEM#3 Pass Controller
  PCIe#D   MEM#4 Pass Controller MEMORY MIRROR MODE: ENABLE/DISABLE
  MEMORY REGION OPTIMIZATION: ENABLE/DISABLE
  OPTIMIZATION TIMING: TIME/TRANSACTION QUANTITY/MANUAL
  OPTIMIZATION MEASUREMENT START TIME: Current/Delay XH/TIME DESIGNATION:
                                       XX MONTH XX DAY XXXX YEAR  HH HOURS MM MIN
  MEASUREMENT TIME  0/10/60/180/360 min, 1/7/30 day
  OPTIMIZATION DURING REBOOTING: ENABLE/DISABLE
  PERIODICAL OPTIMIZATION: ENABLE/DISABLE <MAPPING INFORMATION>
  TRANSLATION FOR MEMORY #1  STARTING ADDRESS INFORMATION, ENDING ADDRESS INFORMATION
  TRANSLATION FOR MEMORY #2  STARTING ADDRESS INFORMATION, ENDING ADDRESS INFORMATION
  TRANSLATION FOR MEMORY #3  STARTING ADDRESS INFORMATION, ENDING ADDRESS INFORMATION
  TRANSLATION FOR MEMORY #4  STARTING ADDRESS INFORMATION, ENDING ADDRESS INFORMATION
```

FIG. 13B

<PCIe BUS SWITCH ROUTING INFORMATION>

MEM#1 -4- Root Complex- PCIe#L (L:1 TO 5)

MEM#1-PCIe#A-PCIe#L: TRANSLATION FOR MEMORY #1 STARTING ADDRESS INFORMATION, ENDING ADDRESS INFORMATION
MEM#2-PCIe#B-PCIe#L: TRANSLATION FOR MEMORY #2 STARTING ADDRESS INFORMATION, ENDING ADDRESS INFORMATION
MEM#3-PCIe#C-PCIe#L: TRANSLATION FOR MEMORY #3 STARTING ADDRESS INFORMATION, ENDING ADDRESS INFORMATION
MEM#4-PCIe#D-PCIe#L: TRANSLATION FOR MEMORY #4 STARTING ADDRESS INFORMATION, ENDING ADDRESS INFORMATION

<STATISTICAL INFORMATION>

| Host BUS | PHYSICAL ADDRESS FOR USE OF CPU | TOTAL TRANSFER CAPACITY | AVERAGE TRANSFER RATE MB/S | AVERAGE BUS OCCUPATION RATIO | ACCESS FREQUENCY |
| PCIe#0 | PHYSICAL ADDRESS FOR USE OF DMA | TOTAL TRANSFER CAPACITY | AVERAGE TRANSFER RATE MB/S | AVERAGE BUS OCCUPATION RATIO | ACCESS FREQUENCY |
| PCIe#1 | PHYSICAL ADDRESS FOR USE OF DMA | TOTAL TRANSFER CAPACITY | AVERAGE TRANSFER RATE MB/S | AVERAGE BUS OCCUPATION RATIO | ACCESS FREQUENCY |
| PCIe#2 | PHYSICAL ADDRESS FOR USE OF DMA | TOTAL TRANSFER CAPACITY | AVERAGE TRANSFER RATE MB/S | AVERAGE BUS OCCUPATION RATIO | ACCESS FREQUENCY |
| PCIe#3 | PHYSICAL ADDRESS FOR USE OF DMA | TOTAL TRANSFER CAPACITY | AVERAGE TRANSFER RATE MB/S | AVERAGE BUS OCCUPATION RATIO | ACCESS FREQUENCY |
| PCIe#4 | PHYSICAL ADDRESS FOR USE OF DMA | TOTAL TRANSFER CAPACITY | AVERAGE TRANSFER RATE MB/S | AVERAGE BUS OCCUPATION RATIO | ACCESS FREQUENCY |
| PCIe#5 | PHYSICAL ADDRESS FOR USE OF DMA | TOTAL TRANSFER CAPACITY | AVERAGE TRANSFER RATE MB/S | AVERAGE BUS OCCUPATION RATIO | ACCESS FREQUENCY |
| PCIe#A | PHYSICAL ADDRESS FOR USE OF DMA | TOTAL TRANSFER CAPACITY | AVERAGE TRANSFER RATE MB/S | AVERAGE BUS OCCUPATION RATIO | ACCESS FREQUENCY |
| PCIe#B | PHYSICAL ADDRESS FOR USE OF DMA | TOTAL TRANSFER CAPACITY | AVERAGE TRANSFER RATE MB/S | AVERAGE BUS OCCUPATION RATIO | ACCESS FREQUENCY |
| PCIe#C | PHYSICAL ADDRESS FOR USE OF DMA | TOTAL TRANSFER CAPACITY | AVERAGE TRANSFER RATE MB/S | AVERAGE BUS OCCUPATION RATIO | ACCESS FREQUENCY |
| PCIe#D | PHYSICAL ADDRESS FOR USE OF DMA | TOTAL TRANSFER CAPACITY | AVERAGE TRANSFER RATE MB/S | AVERAGE BUS OCCUPATION RATIO | ACCESS FREQUENCY |

LOG
ACCESS TIME (YYYY/MM/DD, HH/MM/SS)
BUS OWNER (CPU#1/PCIe#N) I/O/Memory Read/Write PCIe-root/RC-root TRANSFERRED BYTES OCCUPATION TIME

FIG. 17

| OUTPUT | INPUT | | | REMARK |
|---|---|---|---|---|
| Co | CH1 | CL1 | SI1 | |
| 0 | Address1 | Address2 | Address3 | Address3 < Address1 |
| 0 | Address1 | Address2 | Address3 | Address3 > Address2 |
| 1 | Address1 | Address2 | Address3 | Address1 ≤ Address3 ≤ Address2 |

FIG. 18

| OUTPUT | | INPUT | | | |
|---|---|---|---|---|---|
| A33_ctl_AM | A32_ctl_AM | MG#4 | MG#3 | MG#2 | MG#1 |
| 0 | 0 | 1 | 1 | 1 | 0 |
| 0 | 1 | 1 | 1 | 0 | 1 |
| 1 | 0 | 1 | 0 | 1 | 1 |
| 1 | 1 | 0 | 1 | 1 | 1 |
| 1 | 1 | 1 | 1 | 1 | 1 |

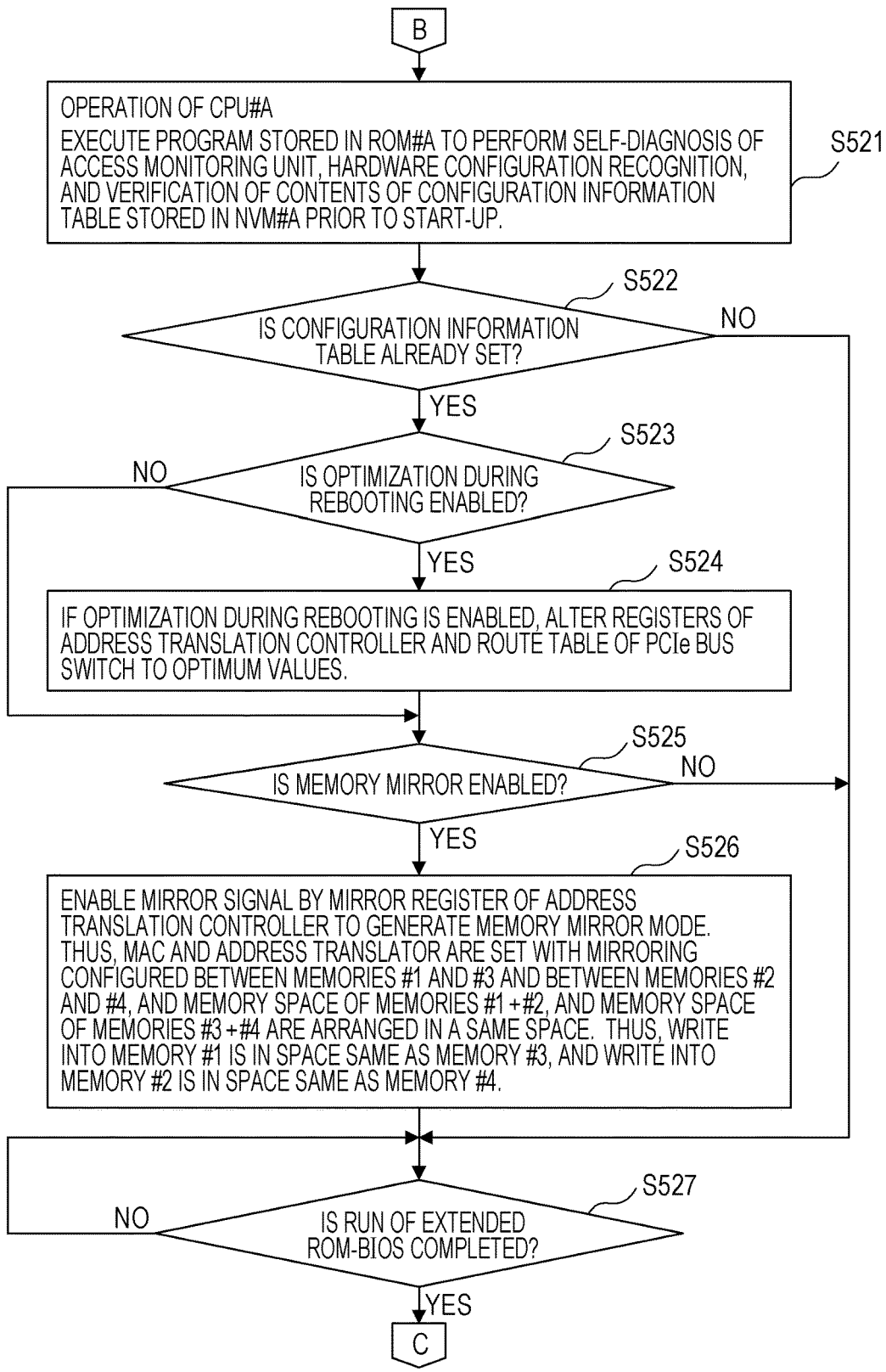

FIG. 21

<CONVENTIONAL USE STATUS OF MEMORY BUS>

| MEMORY BUS | Cycle#1 | Cycle#2 | Cycle#3 | Cycle#4 | Cycle#5 | Cycle#6 |
|---|---|---|---|---|---|---|
| BUS#1 | CPU | | | | | CPU |
| BUS#2 | | PCIe#1 | PCIe#1 | | | |
| BUS#3 | | | | PCIe#2 | PCIe#4 | |
| BUS#4 | | | | | | |

<USE STATUS OF MEMORY BUS OPTIMIZED ACCORDING TO EMBODIMENT>

| MEMORY BUS | Cycle#1 | Cycle#2 | Cycle#3 | Cycle#4 | Cycle#5 | Cycle#6 |
|---|---|---|---|---|---|---|
| BUS#1 | CPU | CPU | CPU | PCIe#3 | PCIe#3 | |
| BUS#2 | PCIe#1 | PCIe#1 | PCIe#1 | CPU | PCIe#1 | PCIe#1 |
| BUS#3 | | CPU | PCIe#2 | PCIe#2 | PCIe#2 | PCIe#2 |
| BUS#4 | PCIe#4 | PCIe#4 | PCIe#4 | | | PCIe#4 |

INFORMATION PROCESSING APPARATUS AND BUS CONTROL METHOD

CROSS-REFERENCE TO RELATED APPLICATION

This application is based upon and claims the benefit of priority of the prior Japanese Patent Application No. 2014-104264, filed on May 20, 2014, the entire contents of which are incorporated herein by reference.

FIELD

The embodiment discussed herein is related to an information processing apparatus and a bus control method.

BACKGROUND

For optimization of system performance, applications are operated in a state close to the real operation state of the system prior to actual operation thereof, and tunings of system performance and real time performance are conducted by using a performance monitor or benchmark software with parameters modified with a change of a buffer area and an inhibition of a specific transaction on the application side.

Related techniques are disclosed in, for example, Japanese Laid-open Patent Publications No. 2000-207348 and No. 9-73430.

In a practical system, when the hardware configuration (configuration of the memory, the CPU type, the mounted I/O, and so on), the installed application or the operating mode (such as the installation environment, concentration of operation time, real time performance requirements, and so on) is changed, transactions and transmission and reception ratios in various buses/interfaces are also changed, and thereby the bus occupation rates are changed.

Especially in the memory bus in which all the devices including the CPU and mounted I/O devices utilize the memory space, there is a problem that overall performance deteriorates when a lot of bus conflicts occur.

Accordingly, to keep system performance optimized, every time a hardware configuration or an installed application is changed, tunings have to be carried out by implementing performance monitoring in actual system checking in consideration of the real system operation mode, or system performance measurement with a benchmark software.

Here, the tunings includes, for example, to change the used CPU to another one having a sufficient memory cache size and processing speed, change the mounted I/O used to another one having a sufficient processing capability, change the buffer area assigned on the memory, and inhibit a specific transaction in order to improve utilization efficiency of the memory bus.

Numerous man-hours are used to determine individual tuning setting values and an optimum hardware configuration. Further, it is not easy to change a hardware configuration, and to change setting values for a buffer area and an inhibition of a specific transaction from time to time according to the operating state of an actual system. This poses a problem of performance deterioration as well due to a gradually increasing difference between the actual operating state and an estimated environment in the course of continuous usage of the once set information.

Further, it is difficult to perform true performance measurement of an actual system because the performance thereof is influenced by application operation of a performance monitor or benchmark software used for performance measurement in the actual system.

An object of the present disclosure is to suppress performance deterioration due to bus conflict.

SUMMARY

According to an aspect of the invention, an information processing apparatus includes: a plurality of memories; a plurality of buses each connected to each of the memories; an input/output device configured to make access to the plurality of memories; a processing unit configured to alter a mapping of a logical address and a physical address of a memory area used by the input/output device; and a switch configured to transfer access from the input/output device to any one of the plurality of buses based on the mapping, whereby the performance deterioration due to bus conflict is suppressed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A is a first example of a memory space table with the memory optimized;

FIG. 3A is a second example of a memory space table with the memory optimized;

FIG. 4A is a third example of a memory space table with the memory optimized;

FIG. 5 is an example of a route table;

FIG. 7 is a truth table of an AND circuit in the address translator;

FIG. 8 is a truth table of a decoder in the address translator;

FIG. 9 is a truth table of the MPX unit;

FIG. 11 is a truth table of a selector;

FIG. 12 is a configuration diagram of an access monitoring unit according to the embodiment;

FIGS. 13A and 13B are examples of configuration information;

FIG. 17 is a truth table of a comparator;

FIG. 18 is a truth table of an encoder;

FIGS. 20A to 20F are flowcharts of a bus control method according to the embodiment; and FIG. 21 is a diagram illustrating a conventional use status of memory bus, and a use status of a memory bus optimized according to the embodiment.

DESCRIPTION OF EMBODIMENT

An information processing apparatus according to an embodiment improves system performance by figuring out, without actual system verification, transactions in interfaces and bus occupation rates of a hardware configuration (configuration of the memory, the CPU type, the mounted I/O devices, and so on) of an actual system, an installed application according to an operation mode (installation environment, concentration of operation time, real time performance requirements, and so on), and automatically making a memory bus occupied by I/O devices efficient without changing the buffer area and changing a setting value for an inhibition of a specific transaction. In addition to the case where there is a change in the hardware configuration, the information processing apparatus according to the embodiment also rebuilds the physical memory mapping to optimize performance without effects from a software, and automatically secures an optimum bus route in the following cases where: an application used in an I/O device is added or changed, the transactions vary due to increase or decrease in the number of users of an on-line database; and the operating environment is changed, for example.

Hereinafter, the embodiment is described with reference to the accompanying drawings.

Figure 1:
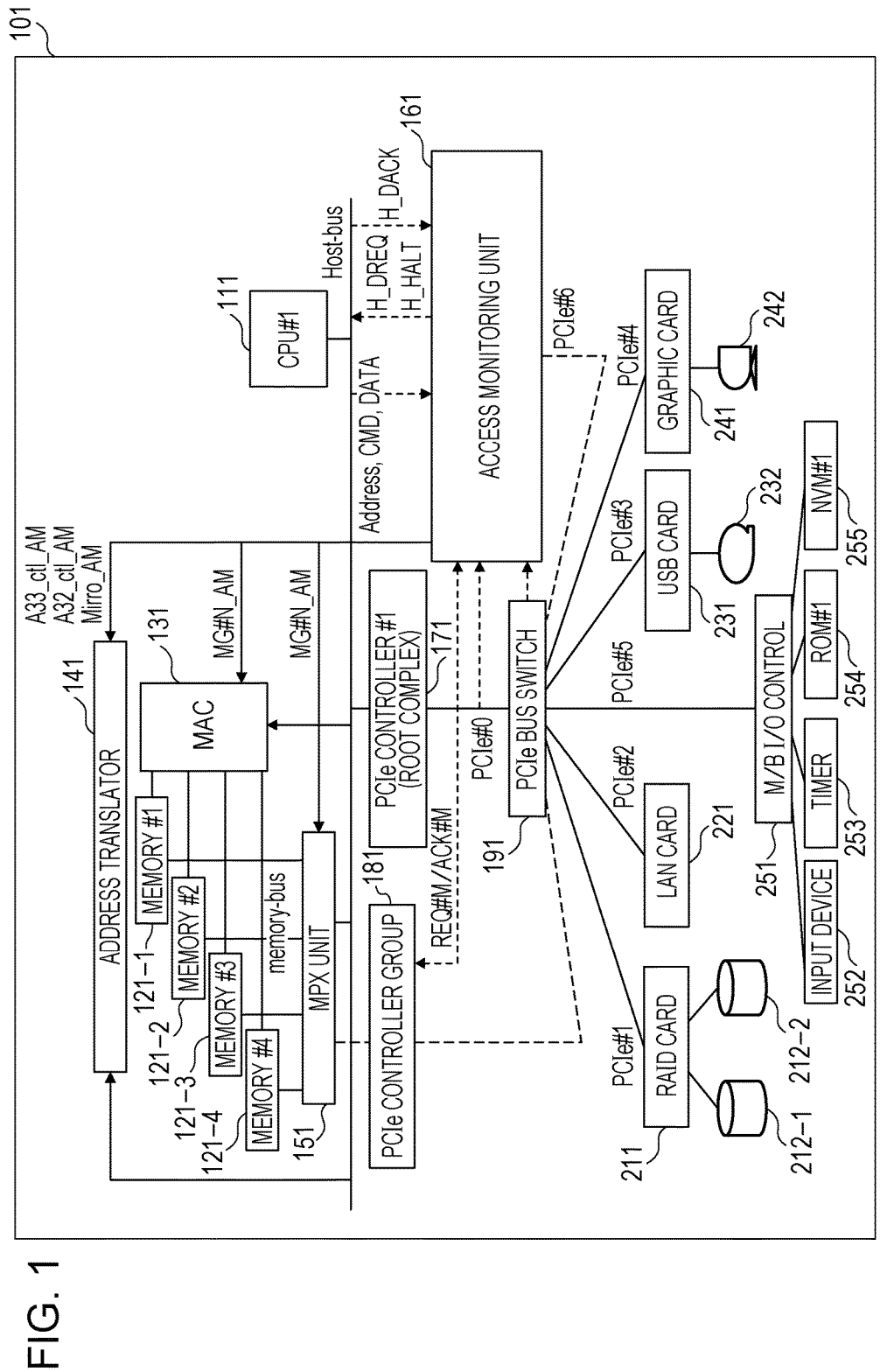
FIG. 1 is a configuration diagram of an information processing apparatus according to an embodiment.

FIG. 1 is a configuration diagram of an information processing apparatus according to the embodiment.

An information processing apparatus 101 includes a central processing unit (CPU) 111, memories (MEM) 121-N (N=1 to 4), a memory access controller (MAC) 131, an address translator 141, a multiplexer (MPX) unit 151, an access monitoring unit 161, a peripheral component interconnect express (PCIe) controller 171, a PCIe controller group 181, a PCIe bus switch 191, a redundant arrays of Inexpensive disks (RAID) card 211, a local area network (LAN) card 221, a universal serial bus (USB) card 231, a graphic (display) card 241, a motherboard (M/B) input/output (I/O) controller 251, hard disk drives (HDD) 212-1, 212-2, a tape device 232, a display device 242, an input device 252, a timer 253, a ROM 254, and a non-volatile memory (NVM) 255.

The CPU 111, the MAC 131, the address translator 141, the MPX unit 151, and the PCIe controller 171 are connected to each other via a host bus.

The information processing apparatus 101 is, for example, a server, a personal computer (PC), or the like.

The CPU 111 performs various processing and makes access to the memories 121-N. The CPU 111 makes configuration register scan of all PCIe devices connected to the PCIe bus when power is turned on or reset, and the access space by executing system BIOS, recognizes the space, and assigns an address area. At that time, for access to a PCIe device under control of the PCIe bus switch 191 where multiple access paths exist, the access route path is registered in a route table within the PCIe bus switch 191. When making access to the memory 121-N, the CPU 111 outputs any of the host bus addresses A00 to A33 indicating an access destination (logical) address to the MAC 131 and the address translator 141 via the host bus. The CPU 111 also outputs host bus data D00 to D63 as write data to the MPX unit 151 via the host bus.

The memory 121-N is a storage device for storing data. The memory 121-N is, for example, a random access memory (RAM). In the following description or drawings, the memory 121-N may be referred to as the memory #N. In the embodiment, capacity of each of the memory 121-N is assumed to be 4 GB. An address in the memory 121-N can be represented by 32-bit data of A31 to A00, and an address in the memory 121-N can be uniquely represented by combining A31 to A00 with 2-bit data A33, A32 identifying the memory 121-N.

The MAC 131 controls access to the memory 121-N. The MAC is described in detail later.

The address translator 141 outputs the select signal (Sel#N) based on the control signal A33_ctl_AM, the control signal A32_ctl_AM, the memory mirror signal Mirror_AM, and the host bus address.

The MPX unit 151 selects either access via the host bus or access via the PCIe controller group 181, and outputs to the memory 121-N.

The access monitoring unit 161 monitors access between the CPU 111 and the memory 121-N, and access between a PCIe device (PCIe controller 171, RAID card 211, LAN card 221, USB card 231, graphic card 241, M/B I/O controller 251, and PCIe controller in PCIe controller group 181) and the memory 121-N, and collects access-related information. The access monitoring unit 161 calculates statistical information from the collected information. The access monitoring unit 161 alters memory mapping, and, based on the altered mapping, controls the address translator 141, the MPX unit 151, and the MAC 131. The access monitoring unit 161 configures the route table within the PCIe bus switch 191.

The access monitoring unit 161 transmits an occupation request signal H_DREQ and a halt signal H_HALT to the CPU 111. The access monitoring unit 161 transmits control signals A33_ctl_AM, A32_ctl_AM, and a memory mirror signal Mirror_AM to the address translator 141.

The access monitoring unit 161 receives a memory address Address for reading and writing, a command CMD for controlling the memory 121-N, and the occupation permission signal H_DACK from the CPU 111. The access monitoring unit 161 is described in detail later. In the following description or drawings, the access monitoring unit 161 may be referred to as the PCIe #6.

The PCIe controller 171 controls data transfer between a PCIe device and a memory 121-N. The PCIe controller 171 is a root complex. In the following description or drawings, the PCIe controller 171 may be referred to as the PCIe #0.

The PCIe controller group 181 comprises four PCIe controllers. Each of the four PCIe controllers is connected to the memory 121-N via an independent memory bus to make access to the connected memory 121-N. The PCIe controller transmits a memory access request REQ#M to the access monitoring unit 161, and receives an access permission signal ACK#M from the access monitoring unit 161. The PCIe controller group 181 is described in detail later.

The PCIe bus switch 191 is a switch for connecting with multiple PCIe devices. The PCIe bus switch 191 is implemented, for example, by circuits. The PCIe bus switch 191 is connected to the RAID card 211, the LAN card 221, the USB card 231, the graphic card 241, and the M/B I/O controller 251. The RAID card 211, the LAN card 221, the USB card 231, the graphic card 241, and the M/B I/O controller 251 are examples of I/O devices. The RAID card 211, the LAN card 221, the USB card 231, and the graphic card 241 are PCIe devices. The PCIe bus switch 191 is also connected to the access monitoring unit 161, and the PCIe controller 171. The PCIe bus switch 191 is also connected to four PCIe controllers of the PCIe controller group 181 via each of four independent buses.

The PCIe bus switch 191 stores the route table, and based on the route table, performs access routing from the PCIe device to the memory 121-N.

The RAID card 211 performs RAID processing such as striping and mirroring by using multiple storage devices. The RAID card 211 is connected to HDDs 212-1, 212-2. The RAID card 211 performs RAID processing such as striping and mirroring by using HDDs 212-1, 212-2. In the following description or drawings, the RAID card 211 may be referred to as the PCIe #1.

The HDD 212 is a storage device for storing data. The LAN card 221 is an interface card for connecting with a network for communication. The LAN card 221 is connected to a network such as the LAN, and so on. In the following description or drawings, the LAN card 221 may be referred to as the PCIe #2.

The USB card 231 is an interface card for connecting with a peripheral device by using a USB. The USB card 231 is connected to the tape device 232. In the following description or drawings, the USB card 231 may be referred to as the PCIe #3.

The tape device 232 is a storage device for storing data. The graphic card 241 is connected to a display device 242 to output a video signal to the display device 242. In the following description or drawings, the graphic card 241 may be referred to as the PCIe #4.

The display device 242 is a device configured to display a video signal received from the graphic card 241.

The M/B I/O controller 251 controls devices connected to the M/B I/O controller 251. In the following description or drawings, the M/B I/O controller 251 may be referred to as the PCIe #5.

The M/B I/O controller 251 is connected to the input device 252, the timer 253, the ROM 254, and the NVM 255.

The input device 252 is a device configured to input data into the information processing apparatus 101. The input device 252 is, for example, a mouse, a keyboard, or the like.

The timer 253 counts the time. The ROM 254 is a storage device for storing data. In the following description or drawings, the ROM 254 may be referred to as the ROM #1.

The NVM 255 is a nonvolatile storage device for storing data. In the following description or drawings, the NVM 255 may be referred to as the NVM #1.

To optimize the performance in the information processing apparatus 101, it is important to reduce access conflict between the CPU and the memory, and data transfer from I/O devices to the memory. To solve this problem, the information processing apparatus 101 according to the embodiment includes a direct access path comprising independent buses to memory areas from I/O devices in which a bus conflict occurs during data transfer, and an access monitoring unit 161 configured to alter mapping from a memory access space of the CPU 111 through the MPX unit 151 to a physical address memory space such that a memory access area is changed from a memory address area actually used by the CPU to an area in which simultaneous accesses between CPU/memories and between I/O devices/memories are available. The direct access path uses independent access routes for I/O devices/memories which allow simultaneous access of I/O devices to memories and thereby suppress performance deterioration due to an access conflict in the bus.

Next, multiple examples of the memory space arrangement with memory space assignment for I/O devices optimized are described.

FIG. 2A is a first example of a memory space table with the memory optimized.

Assume a memory space used by the CPU as the memory space A, a memory space used by the display card as the memory space B, a memory space used by the RAID card as the memory space C, and a memory space used by the LAN card as the memory space D.

The memory space table of FIG. 2A contains the intended use, the logical space, and the physical space by associating with each other.

The intended use indicates intended use of the memory spaces. That is, the intended use indicates the device using the memory space.

The logical space indicates the range of the logical address in the memory space.

The physical space indicates the range of the physical address in the memory space.

In the initial state, the physical address of a same value is assigned to the logical address. That is, in the initial state, memory spaces A and B are assigned to the space of the memory #1, and memory spaces C and D are assigned to the space of the memory #2.

Figure 2B:
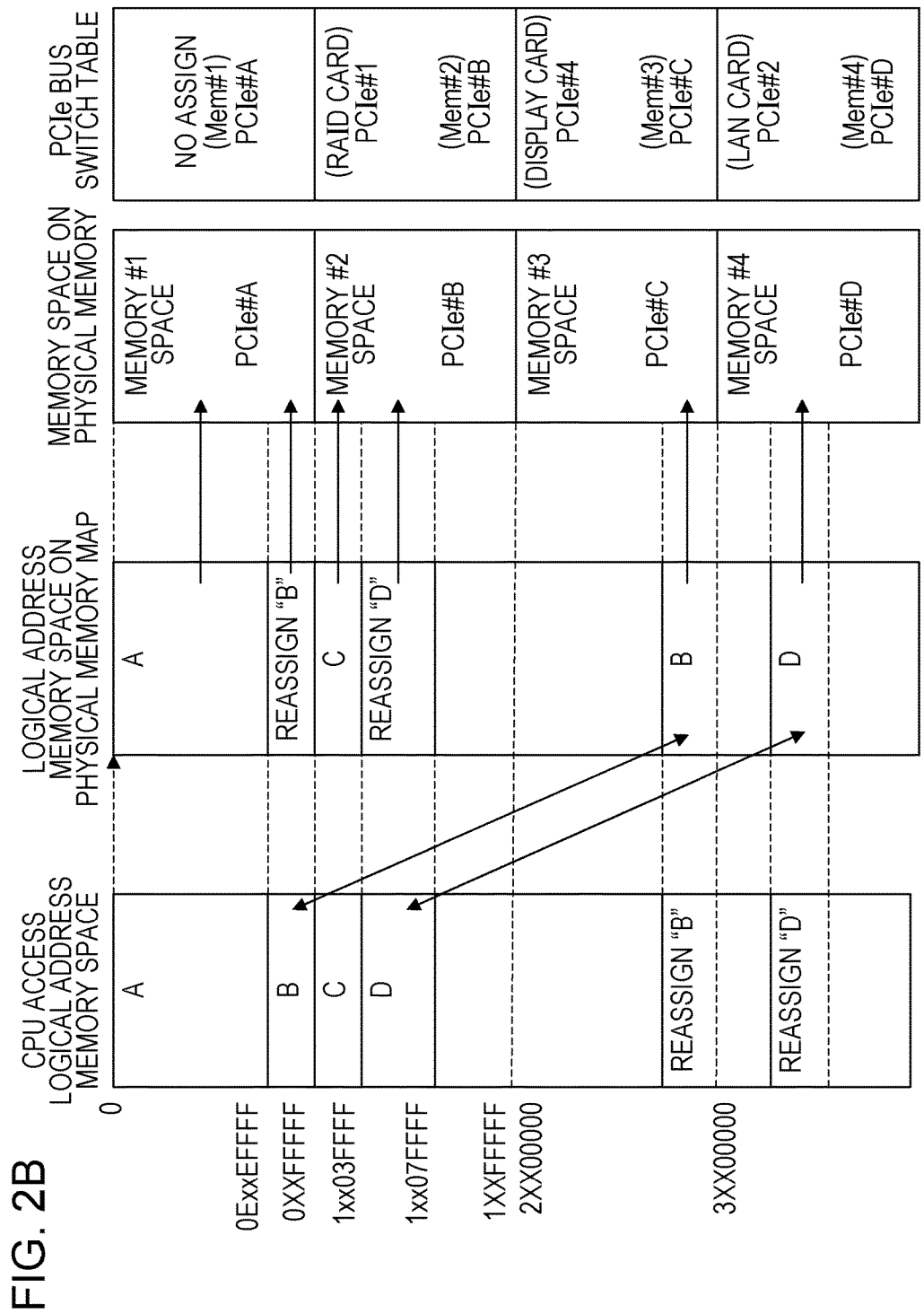
FIG. 2B is a first example of a memory space with the memory optimized.

In FIGS. 2A and 2B, assignment of memory spaces is altered in such a manner that multiple memory spaces are not assigned to a same space in the memory 121-N. Assignment of an altered memory space is represented by the memory space table as illustrated in FIG. 2A.

Logical addresses of the memory space A are 0 to 0ExxxFFFFF.

Physical addresses of the memory space A are 0 to 0ExxxFFFFF.

Logical addresses of the memory space B are 0Fxxx00000 to 0FxxxFFFFF.

Physical addresses of the memory space B are 2Fxxx00000 to 2FxxxFFFFF.

Logical addresses of the memory space C are 10xxx00000 to 10xxx3FFFF.

Physical addresses of the memory space C are 10xxx00000 to 10xxx3FFFF.

Logical addresses of the memory space D are 10xxx40000 to 10xxx7FFFF.

Physical addresses of the memory space D are 30xxx40000 to 30xxx7FFFF.

FIG. 2B is a first example of the memory space with the memory optimized. The memory space based on the memory space table of FIG. 2A is as illustrated in FIG. 2B.

As illustrated in FIG. 2B, the memory space B is mapped into the memory #3, and the memory space D is mapped into the memory #4. That is, physical addresses of the memory space B are altered from 0Fxxx00000 to 0FxxxFFFFF to 2Fxxx00000 to 2FxxxFFFFF.

Thus, memory spaces A, B, C, and D are arranged in the memories 121-N different from each other. Assigned (re-assigned) areas are alternated by the assignment source and the assignment destination.

Next, a memory mapping with memory optimization performed by stopping the memory mirror is shown.

The information processing apparatus 101 includes a memory mirror function. The memory mirror is a function to write same data into multiple memories by allocating a same logical address to multiple memories.

When the information processing apparatus according to the embodiment is in the memory mirror mode, memories #1 and #3, and memories #2 and #4 are paired in a same address mapping respectively, and same data is written into a pair of memories #1 and #3, and a pair of memories #2 and #4. In the memory mirror mode, range of the logical address in the space of the memory #3 is 0 to 0XXFFFFF which is same as the memory #1, and range of the logical address in the space of memory #4 is 1XX00000 to 1XXFFFFF which is same as the memory #2. When the memory mirror is disabled, range of the logical address in the space of memory #3 is 2XX00000 to 2XXFFFFF, and range of the logical address in the space of memory #4 is 3XX00000 to 3XXFFFFF.

FIG. 3A is a second example of a memory space table with the memory optimized.

Description of the memory space table with the memory optimized of FIG. 3A is omitted as being same as the memory space table of FIG. 2A.

Figure 3B:
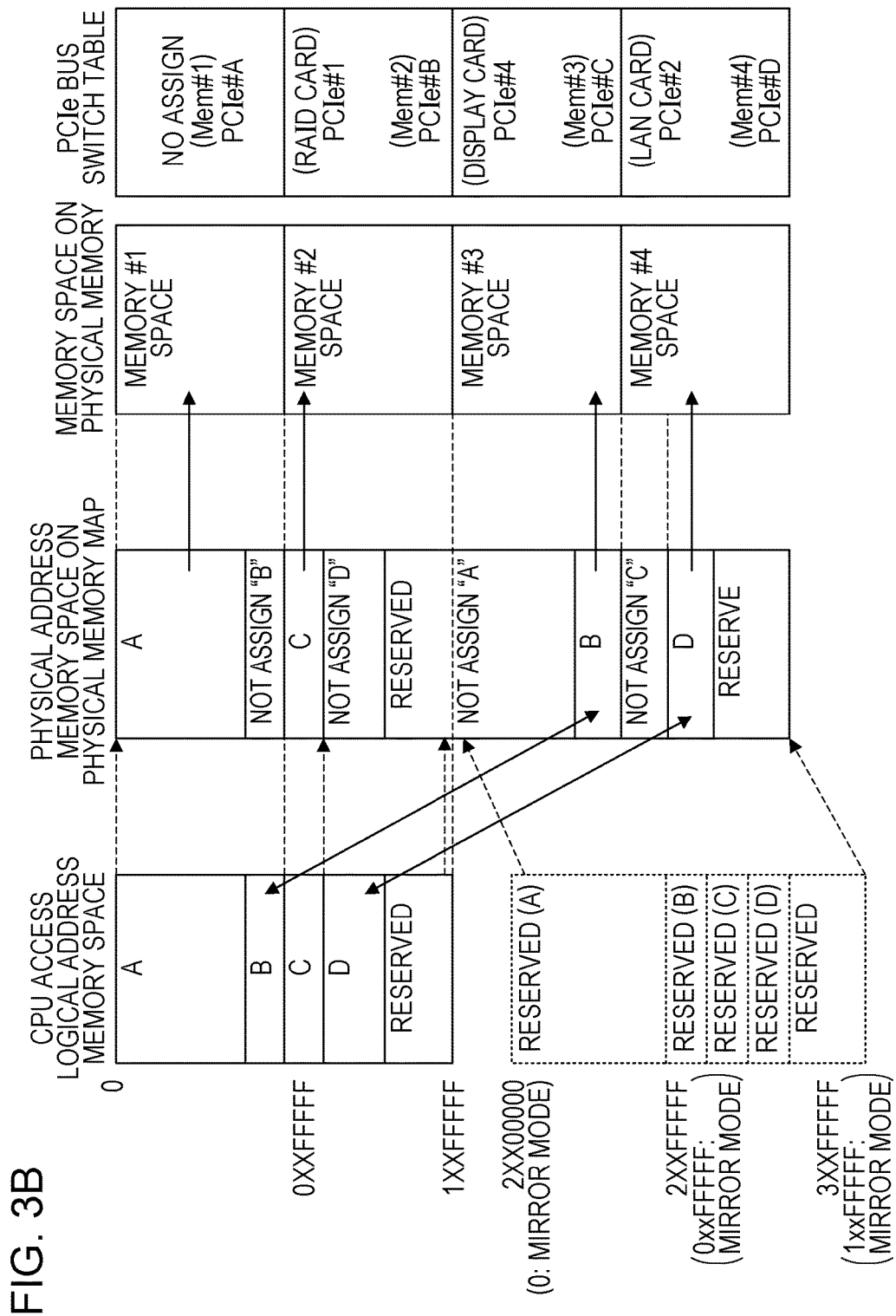
FIG. 3B is a second example of a memory space with the memory optimized.

FIG. 3B is a second example of the memory space with the memory optimized.

Here, mapping is altered by stopping the memory mirror from the state using the memory mirror.

In FIGS. 3A and 3B, memory spaces are reassigned in such a manner that multiple memory spaces are not assigned to a same space in the memory 121-N. One of two areas in which same data is written in the memory mirror mode is assigned to a re-assigned memory space. Reassigned memories are represented by a memory space table as illustrated in FIG. 3B.

The memory space based on the memory space table of FIG. 3A is as illustrated in FIG. 3B. In the memory mirror mode, the memory space B writes same data into memories #1 and #3. By reassignment of the memory space B, the area of the memory #3 in which data of the memory space B is written in the memory mirror mode is assigned to the memory space B. Similarly, the memory space D is mapped to the memory #4. Thus, memory spaces A, B, C, and D are arranged in memories different from each other.

Next, memory mapping with the memory optimized based on the statistical information is shown.

FIG. 4A is a third example of a memory space table with the memory optimized.

Assume a memory space used by the CPU as the memory space A, a memory space used by the display card as the memory space B, a memory space used by the RAID card as the memory space C, a memory space used by the LAN card as the memory space D, and a memory space used by the USB card as the memory space E.

The memory space table of FIG. 4A contains the intended use, the logical space, the physical space, and the statistical information by associating with each other.

The intended use indicates the intended use of the memory space. That is, the intended use indicates the device using the memory space.

The logical space indicates the range of the logical address in the memory space.

The physical space indicates the range of the physical address in the memory space.

The statistical information is statistical information on the access to the memory of the device using the memory space.

In the initial state, the physical address of a same value is assigned to the logical address. That is, in the initial state, memory spaces A and B are assigned to the space of the memory #1, and memory spaces C, D and E are assigned to the space of the memory #2.

Figure 4B:
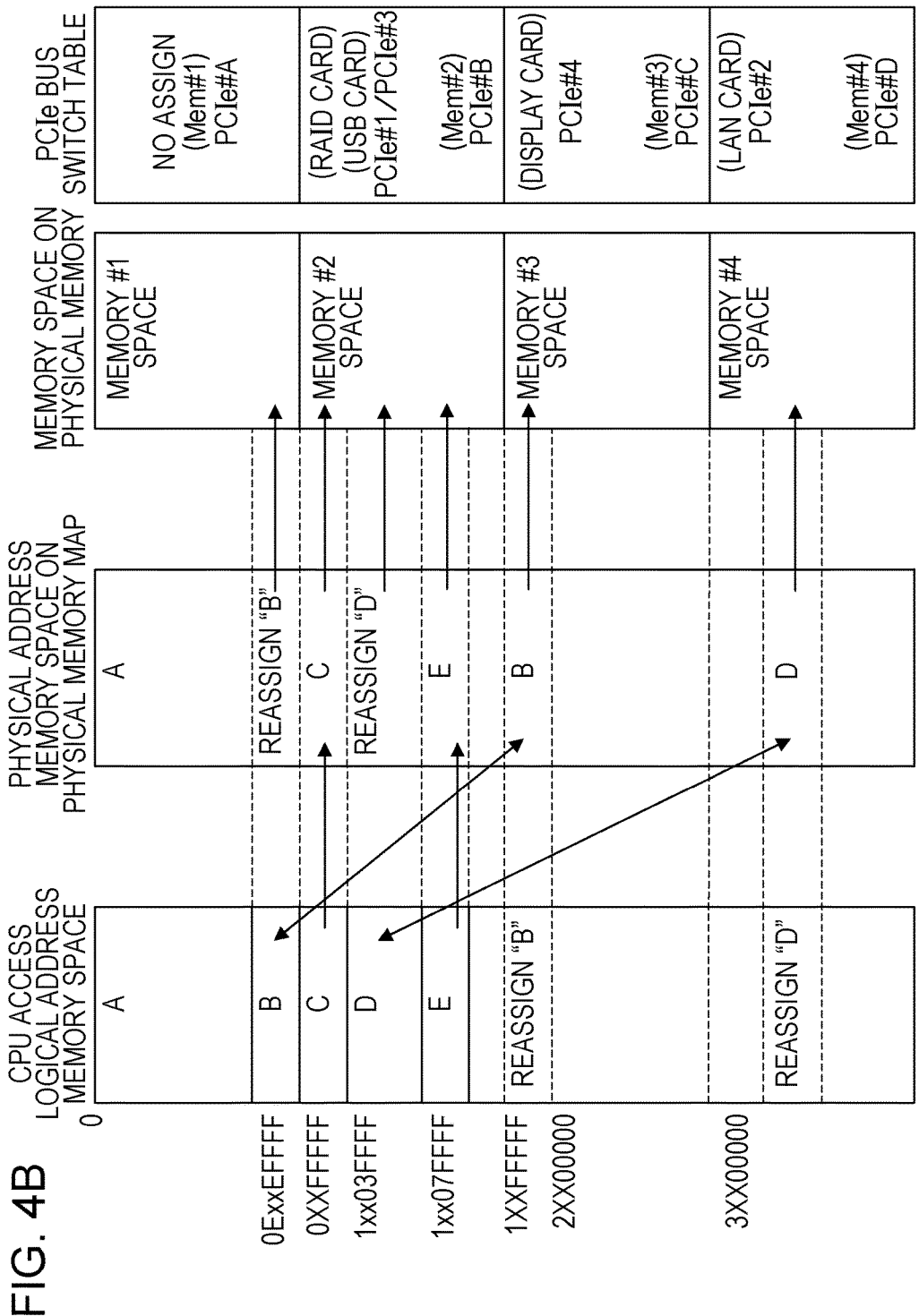
FIG. 4B is a third example of a memory space with the memory optimized.

In FIGS. 4A and 4B, the memory space is reassigned by using the statistical information. Then, reassigned memory space is represented by the memory space table as illustrated in FIG. 4A.

Logical addresses of the memory space A are 0 to 0ExxxFFFFF.

Physical addresses of the memory space A are 0 to 0ExxxFFFFF.

Logical addresses of the memory space B are 0Fxxx00000 to 0FxxxFFFFF.

Physical addresses of the memory space B are 2Fxxx00000 to 2FxxxFFFFF.

Logical addresses of the memory space C are 10xxx00000 to 10xxx3FFFF.

Physical addresses of the memory space C are 10xxx00000 to 10xxx3FFFF.

Logical addresses of the memory space D are 10xxx40000 to 10xxx7FFFF.

Physical addresses of the memory space D are 30xxx40000 to 30xxx7FFFF.

Logical addresses of the memory space E are 10xxx80000 to 10xxxDFFFF.

Physical addresses of the memory space E are 10xxx80000 to 10xxxDFFFF.

Here, a method of calculating the mapping (memory assignment) of the logical space and the physical space based on the statistical information is described.

Here, the mapping is calculated based on the statistical information illustrated in FIG. 4A.

The CPU 111 has access frequency=40, average occupation ratio=20%, and average transfer rate=3G. The graphic card 241 (illustrated) has access frequency=30, average occupation ratio=20%, and average transfer rate=1G. The RAID card 211 has access frequency=30, average occupation ratio=20%, and average transfer rate=0.5G. The LAN card 221 has access frequency=30, average occupation ratio=30%, and average transfer rate=2G. The USB card 231 has access frequency=10, average occupation ratio=10%, and average transfer rate=0.3G.

The average occupation ratio is a ratio of the time duration in which a device using the memory space uses the bus.

The access frequency represents a fluctuation of the occupation ratio per unit hour as an index of the access variation. Access frequency=fluctuation rate of the occupation ratio per second (100*(maximum occupation ratio-minimum occupation ratio))/average of maximum occupation ratio per hour The average transfer rate is a mean of data transfer rates of devices using the memory space.

Mapping is calculated according to the following procedure:

1) PCIe cards (display card, RAID card, LAN card, and USB card) are arranged in the descending order of the average bus occupation rate. In any of the processing below, CPU is placed at the end.

For the statistical information illustrated in FIG. 4A, PCIe cards in the descending order of the average bus occupation rate are the LAN card (30%), the RAID card (20%), the display card (20%), the USB card (10%), and the CPU (20%).

2) The average bus occupation rate is multiplied by the access frequency, and PCIe cards are rearranged in the descending order of values thus calculated.

PCIe cards rearranged in the descending order of values obtained by multiplying the average bus occupation rate by the access frequency are the LAN card=9 (=30%*30), the RAID card=6 (=20%*30), the display card=6 (=20%*30), the USB card=1 (=10%*10), and the CPU=8 (=20%*40).

3) Values calculated in 2) are further multiplied by the average transfer rate, and PCIe cards are rearranged in the descending of values thus calculated. PCIe cards rearranged in the descending order of values obtained by multiplying the values obtained in 2) by the average transfer rate are the LAN card=18 (=9*2), the display card=6 (=6*1), the RAID card=3 (=6*0.5), the USB card=0.3 (=1*0.3), and the CPU=24 (=8*3).

4) If some of the cards have to be mapped to the same memory 121-N according to the above result, mapping of the CPU access logical space and physical space is calculated such that a combination of cards arranged in the space of the same memory 121-N excluding the CPU have the smallest sum of the values calculated in 3). The mapping is performed in such a manner that the memory space of the CPU 111 and the memory space of a PCIe card are not mapped to the same memory 121-N.

Thus, the memory space C of the RAID card and the memory space E of the USB card are combined with each other. The memory space B assigned to the same memory space as the CPU is mapped to the memory #3.

FIG. 4B is a third example of a memory space with the memory optimized.

The memory space based on the memory space table of FIG. 4A is as illustrated in FIG. 4B.

As illustrated in FIG. 4B, the memory space B is mapped into the memory #3, and the memory space D is mapped into the memory #4. Memory spaces A, C and E are mapped into the memories #1, #2, and #3 respectively with mapping thereof unchanged.

FIG. 5 is an example of the route table.

A route table 192 is stored in the PCIe bus switch 191. The route table 192 contains memory assignment (mapping) information and access path information.

The route table 192 includes "Destination", "Source", "Device path", "Turn list", and "Condition" by associating with each other.

"Destination" indicates an access destination (transmission destination) device.

"Source" indicates an access source (transmission source) device.

"Device path" indicates a passing-through device.

"Turn list" indicates weighting per port of the PCIe bus switch. As the value of "Turn list" between "Device paths" becomes smaller, the priority of the route becomes higher.

"Condition" indicates the condition applicable to a route. As "Condition", for example, the starting address and the ending address of the area of the CPU access logical memory space assigned by memory optimization are stated.

The route table 192 of FIG. 5 is a route table when PCIe #L (L=1 to 5) is used as "Source".

For example, when a mapping as illustrated in FIGS. 2A and 2B is configured, the starting address (0Fxxx00000) and the ending address (0FxxxFFFFF) of the CPU access logical memory space in the memory space B assigned to the memory #3 are stated in the "Condition" column of the record with the memory #3 as "Destination" and the PCIe #4 (display card 241) as "Source" in the route table 192.

Based on the address at the header of a packet sent from the route table 192 and the endpoint, the PCIe bus switch 191 determines the transfer destination of the packet and transfers the packet without receiving an instruction of the PCIe controller 171 (Root Complex).

For example, when the address stated at the header of the packet received from the PCIe #4 (display card 241) is included within the range between the starting address (0Fxxx00000) and the ending address (0FxxxFFFFF) stated in "Condition", the PCIe bus switch 191 transfers the packet to the PCIe controller #C associated with the memory #3 since "Destination" is the memory #3.

Figure 6:
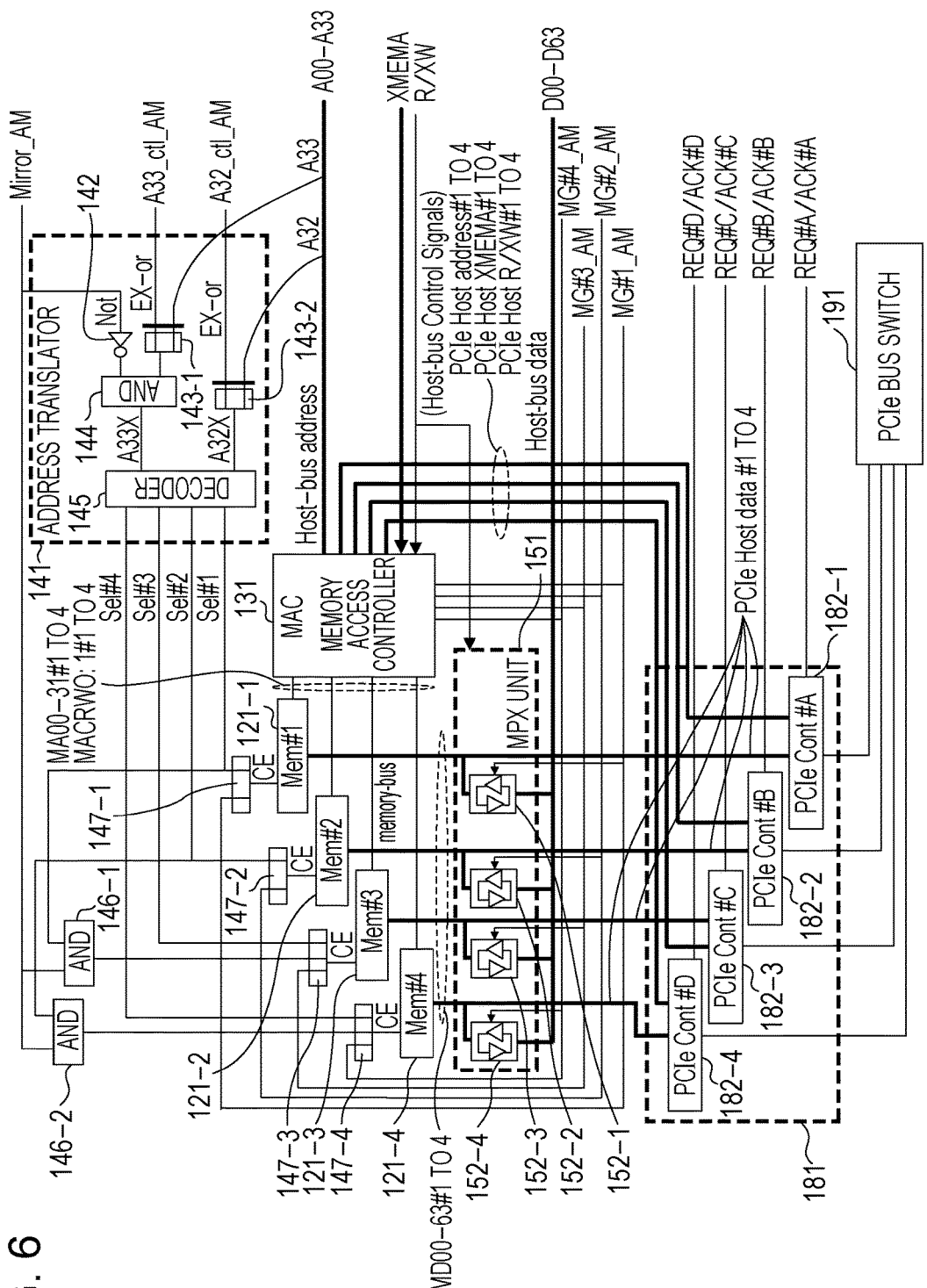
FIG. 6 is a detailed configuration diagram of an address translator, a MPX unit, and a PCIe controller group according to the embodiment.

FIG. 6 is a detailed configuration diagram of the address translator, the MPX unit, and the PCIe controller group according to the embodiment.

The address translator 141 includes a NOT circuit (inverter) 142, exclusive logical ring (EX-OR) circuits 143-1, 143-2, an AND circuit 144, and a decoder 145.

The NOT circuit 142 receives the memory mirror enable signal Mirror_AM indicating whether the memory mirror is enabled or not, and outputs the inverted memory mirror enable signal to the AND circuit 144.

The EX-OR circuit 143-1 receives A33_ctl_AM and A33. A33 is a most significant bit of the host bus address.

The EX-OR circuit 143-2 receives A32_ctl_AM and A32. A32 is a second digit bit next to the most significant bit of the host bus address.

The AND circuit 144 calculates a logical product between output of the NOT circuit 142 and output of the EX-OR circuit 143-1, and outputs the calculated result to the decoder 145. Here, the output signal of the AND circuit 144 is referred to as A33X.

Relationship between input of the address translator and output of the AND circuit 144 is as per the truth table illustrated in FIG. 7.

The decoder 145 receives output A33X of the AND circuit 144 and output A32X of the EX-OR circuit 143-2.

Relationship between input and output of the decoder 145 is as per the truth table illustrated in FIG. 8.

The decoder 145 outputs the select signal Sel#1 to an AND circuit 146-1 and an OR circuit 147-1, the select signal Sel#2 to an AND circuit 146-2 and an OR circuit 147-2, the select signal Sel#1 to an OR circuit 147-3, and the select signal Sel#4 to an OR circuit 147-4.

The AND circuit 146-1 receives the select signal Sel#1 and the memory mirror enable signal Mirror_AM, and outputs the logical sum of the select signal Sel#1 and the memory mirror enable signal Mirror_AM.

The AND circuit 146-2 receives the select signal Sel#2 and the memory mirror enable signal Mirror_AM, and outputs the logical sum of the select signal Sel#2 and the memory mirror enable signal Mirror_AM.

The OR circuit 147-1 receives the select signal Sel #1 and the direct access select signal (MPX control signal) MG#1_AM, and outputs the logical sum of the select signal Sel#1 and the direct access select signal MG#LAM to the memory 121-1 as the chip enable (CE).

The OR circuit 147-2 receives the select signal Sel#2 and the direct access select signal MG#2_AM, and outputs the logical sum of the select signal Sel#2 and the direct access select signal MG#2_AM to the memory 121-2 as the chip enable (CE).

The OR circuit 147-3 receives the select signal Sel#3, the direct access select signal MG#3_AM, and output of the AND circuit 146-1, and outputs the logical sum of the select signal Sel#3, the direct access select signal MG#3_AM, and output of the AND circuit 146-1 to the memory 121-3 as the chip enable (CE).

The OR circuit 147-4 receives the select signal Sel#4, the direct access select signal MG#4_AM, and output of the AND circuit 146-2, and outputs the logical sum of the select signal Sel#4, the direct access select signal MG#4_AM, and output of the AND circuit 146-2 to the memory 121-4 as the chip enable (CE).

When the received chip enable is ON, the memory 121-N reads or writes data.

The MPX unit 151 has switches 152-N (N=1 to 4). The switches 152-N are positioned between a memory bus connecting to the memory 121-N, and the host bus.

The switch 152-N controls data communication between the host bus and the memory 121-N in response to the direct access select signal MG#N_AM.

When the switch 152-N is ON, the switch 152-N transfers host bus data D00 to D63 to the memory 121-N, and transfers memory data MD00 to 63#N from the memory 121-N to the host bus.

The MPX unit 151 receives the host bus read/write signal R/XW from the CPU 111.

Relationship between input and output of the MPX unit 151 is as per the truth table illustrated in FIG. 9. In FIG. 9, "X" indicates "don't care", and "Z" indicates high impedance.

The PCIe controller group 181 has PCIe controllers 182-M (M=A to D). In the following description or drawings, the PCIe controller 182-M may be referred to as the PCIe #M.

The PCIe controllers 182-A to 182-D are connected to memories 121-1 to 121-4 respectively via buses independent of each other.

When making access to the memory 121-N, the PCIe controller 182-M transmits the memory access request REQ#M to the access monitoring unit 161. Upon receiving the access permission signal ACK#M, the PCIe controller 182-M makes access to the memory 121-N.

The PCIe controllers 182-A to 182-D output write data PCIe HOST data #1 to #4 to the memories 121-1 to 121-4 respectively. The PCIe controllers 182-A to 182-D output PCIe memory addresses PCI Host Address #1 to #4, PCIe memory access signals PCIe Host XMEMA #1 to #4, and PCIe read/write signals PCIe Host R/XW #1 to #4, to the MAC 131 in a corresponding manner. PCIe memory addresses PCI Host Address #1 to #4 are addresses of the memory 121-N which performs read or write. PCIe memory access signals PCIe Host XMEMA #1 to #4 indicate memory access from the corresponding one of PCIe controllers 182-A to 182-D, to the memory 121-N. PCIe read/write signal PCIe Host R/XW W #1 to #4 indicates read or write from the corresponding one of PCIe controllers 182-A to 182-D to the memory 121-N.

The MAC 131 receives host bus addresses A00 to A33, the host bus memory access signal XMEMA, and the host bus read/write signal R/XW from the CPU 111. The MAC 131 receives PCIe memory addresses PCIe Host Address #1 to #4, PCIe memory access signals PCIe Host XMEMA #1 to #4, and PCIe read/write signals PCIe Host R/XW #1 to #4, from PCIe controllers 182-A to 182-D. The MAC 131 receives the direct access select signal MG#N_AM from the access monitoring unit 161. Based on those received signals, the MAC 131 outputs the memory address MA00 to 31#N and the memory control signal MACRWO:1#N to the memory 121-N. Configuration of the MAC 131 is described in detail later.

In a conventional information processing apparatus, access from the PCIe #1 to the memory 121-N is made via PCIe #1 (RAID card), PCIe #5 (PCIe bus switch), and PCIe #0 (root complex).

In the information processing apparatus according to the embodiment, each of the PCIe controllers 182-M has a configuration register in which an access space is configured; PCIe #A as an access space of Mem #1, PCIe #B as an access space of Mem #2, PCIe #C as an access space of Mem #3, and PCIe #D as an access space of Mem #4.

When making direct access from the I/O device, the PCIe bus switch 191 transfers the packet to a PCIe controller #M corresponding to the memory 121-N including a memory area assigned to the I/O device based on the route table with reference to the address at the header of the packet sent from the endpoint but without receiving a direction from the PCIe controller 171 (root complex). According to the embodiment, there are four endpoint-to-endpoint access paths. Therefore, maximum four memories can be accessed simultaneously. Also, simultaneous access path can be secured easily by adding an access path.

Figure 10:
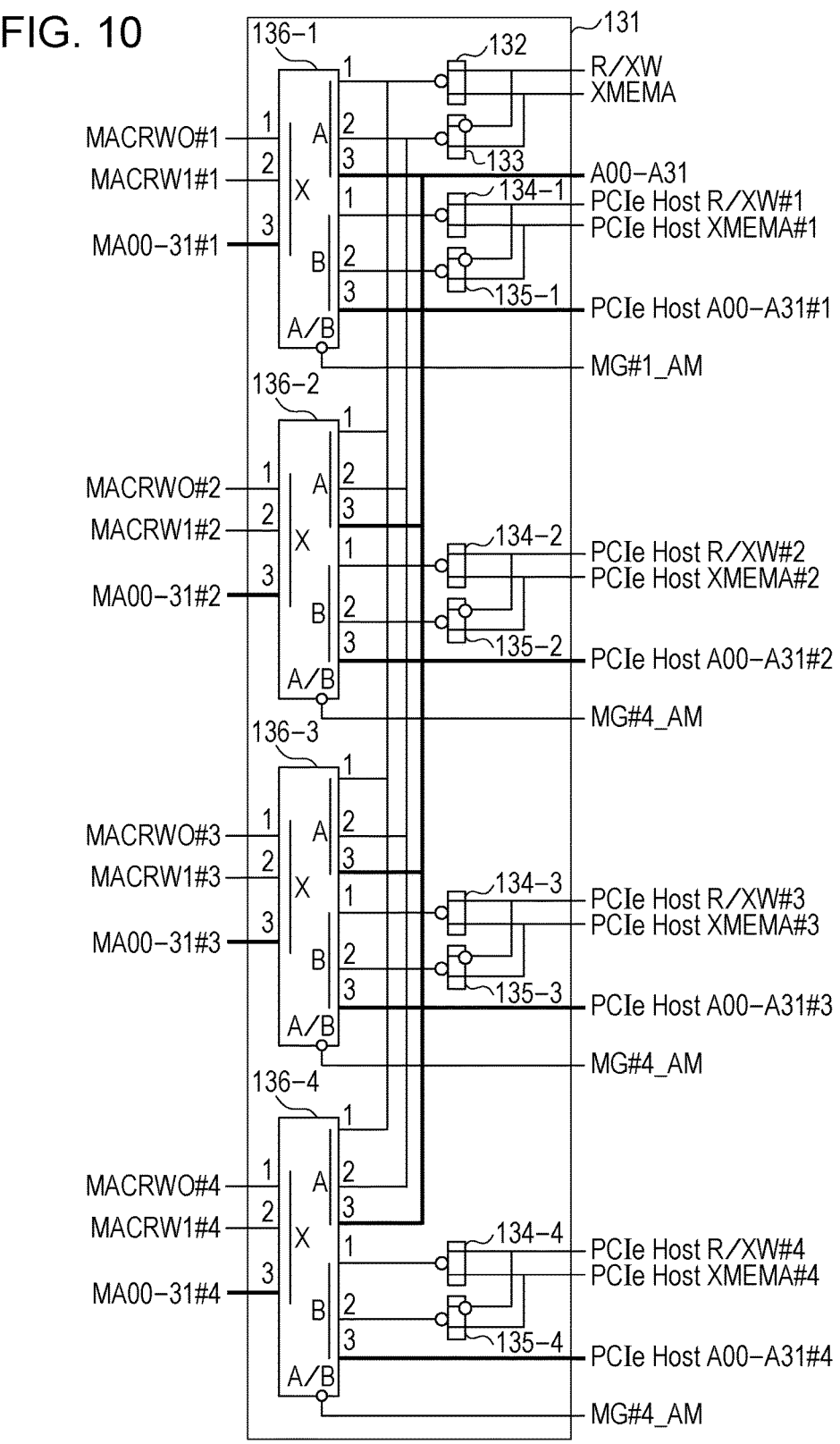
FIG. 10 is a detailed configuration diagram of a MAC according to the embodiment.

FIG. 10 is a detailed configuration diagram of the MAC according to the embodiment.

The MAC 131 includes OR circuits, 132, 133, 134-N, 135-N, and selectors 136-N.

The OR circuit 132 receives the host bus read/write signal R/XW, and the host bus memory access signal XMEMA.

The OR circuit 133 receives an inverted value of the host bus read/write signal R/XW, and the host bus memory access signal XMEMA.

The OR circuit 134-N receives the PCIe read/write signal PCIe Host R/XW #N, and the PCIe memory access signal PCIe HOST XMEMA #N.

The OR circuit 135-N receives an inverted value of the PCIe read/write signal PCIe HOST R/XW #N, and the PCIe memory access signal PCIe HOST XMEMA #N.

The selector 136-N receives output of OR circuits 133, 133, and the host bus addresses A00 to A33. Assume output of OR circuits 133, 133 and the host bus addresses A00 to A33 as input A=(A1, A2, A3).

The selector 136-N receives output of OR circuits 134-N, 135-N, and PCIe memory addresses PCIe HOST A00 to A31#N. Assume output of OR circuits 134-N, 135-N, and PCIe memory addresses PCIe HOST A00 to A31#N as input B=(B1, B2, B3).

The selector 136-N receives the direct access select signal MG#N_AM. Assume the direct access select signal MG#N_AM as input A/B.

In response to the direct access select signal MG#N_AM, the selector 136-N selects either input A or B, and outputs as output X=(X1, X2, X3).

FIG. 11 is a truth table of selectors.

As illustrated in the truth table of FIG. 11, when the input A/B (direct access select signal MG#i_AM) is 0, the selector 136-N selects and outputs the input B, and when the input A/B (direct access select signal MG#N_AM) is 1, the selector 136-N selects and outputs the input A.

FIG. 12 is a configuration diagram of the access monitoring unit according to the embodiment.

The access monitoring unit 161 includes a CPU 162, a PCIe-BUS access tracing unit 163, an address translation controller 164, a HOST-BUS access tracing/Direct Memory Access (DMA) controller 165, a NVM 166, a ROM 167, a memory 168, a PCIe controller 169, and a timer 170.

The CPU 162 is a processing device performing various processing. The CPU 162 reads and executes programs stored in the ROM 167.

The PCIe-BUS access tracing unit 163 traces and records access of the PCIe controller.

The address translation controller 164 translates the address.

The HOST-BUS access tracing/DMA controller 165 traces access between the CPU 111 and the memory.

The NVM 166 is a nonvolatile storage device for storing data. In the following description or drawings, the NVM 166 may be referred to as the NVM #A. The NVM 166 stores the configuration information table.

The ROM 167 is a storage device for storing data. In the following description or drawings, the ROM 167 may be referred to as the ROM #A. The ROM 167 stores the extended ROM-BIOS program, the initialization program, and the main program.

The extended ROM-BIOS program is a program performing such processing as response during the extended ROM-SCA from the system BIOS, configuration of the NVM 166, and recognition of the processing content.

The initialization program is a program performing interrupt vector setting of the CPU 162, and initialization processing of peripheral I/Os (timer and register).

The main program is a program performing the processing which includes making access to the I/O address mapping and the memory address mapping of all PCIe spaces configured by the CPU 111 across overall configuration space from the CPU 162 of the access monitoring unit 161, and reflecting PCIe card configuration information and the like on the configuration information stored in the NVM 166, start control of the HOST-BUS access tracing/DMA controller 165, and the PCIe-BUS access tracing unit 163, analysis of traced data, statistics calculation, and storage of statistical information into the NVM 166, generation of a memory space table indicating a mapping of the logical address and the physical address, writing the address translation controller into the register, configuration of a routing table of the PCIe bus switch, and reboot request to the CPU 111.

The memory 168 is a storage devices for storing data. The memory 168 is, for example, a RAM. In the following description or drawings, the memory 168 may be referred to as the memory #A.

The PCIe controller 169 is connected to the PCIe bus switch 191 to transmit and receive data from the PCIe bus switch 191.

The timer 170 counts the time.

FIGS. 13A and 13B are examples of the configuration information table.

The configuration information table contains items and information including:

Memory-mounted information: includes the physical address and the capacity of memories mounted in the information processing apparatus 101.

PCIe-mounted information: includes PCIe devices mounted in the information processing apparatus 101.

Memory mirror mode: indicates whether memory mirroring is performed. "Enable" indicates that memory mirroring is performed, and "Disable" indicates that memory mirroring is not performed.

Memory area optimization: indicates whether memory area optimization (mapping alteration) is performed. "Enable" indicates that optimization is performed, and "Disable" indicates that optimization is not performed.

Optimization timing: indicates the optimization timing. Optimization measurement start time: indicates time to start measurement.

Measurement time: indicates measurement duration.

Optimization during rebooting: indicates whether optimization is performed during rebooting. "Enable" indicates that optimization is performed during rebooting, and "Disable" indicates that optimization is not performed during rebooting.

Periodical optimization: indicates whether optimization is performed periodically. "Enable" indicates that optimization is performed periodically, and "Disable" indicates that optimization is not performed periodically.

Mapping information: contains the starting address and the ending address of a memory space assigned to each memory due to a change in the mapping. For example, when a mapping illustrated in FIGS. 2A and 2B is made, the translation starting address information of the memory #3 contains the logical address (0Fxxx00000) at the head address of the memory space B, and the ending address information contains the logical address (0FxxxFFFFF) at the ending address of the memory space B. The translation for memory #4 starting address information contains the logical address (10xxx40000) of the head address of the memory space D, and the ending address information contains the logical address (10xxx07FFFF) of the ending address of the memory space D.

PCIe bus switch routing information: contains a path between the memory 121-N and the PCIe device, and the starting address and the ending address of the memory space assigned to each memory due to a change in the mapping.

Statistical information: contains the physical CPU address, the total transfer capacity, the average bus occupation rate, and the access frequency of the host bus. The statistical information also contains the physical DMA address, the total transfer capacity, the average bus occupation rate, and the access frequency of each of PCIe #0 to D.

Log: contains access time, bus owner, access type (I/O/memory), access type (read/write), access path (PCIe-route/RC(Root Complex)-route), transferred data size (transferred bytes), and bus occupation time (occupation time).

Figure 14:
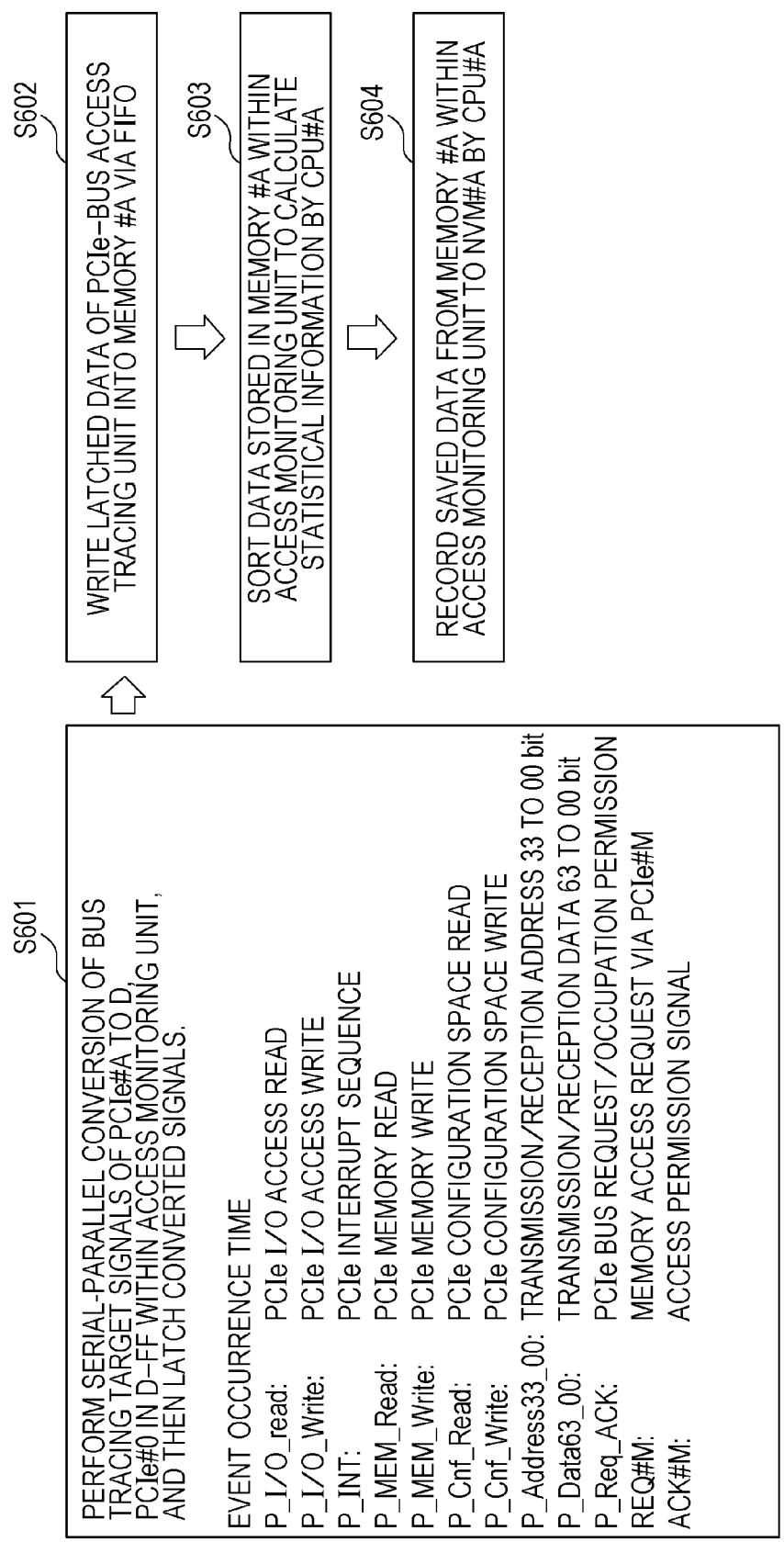
FIG. 14 is a diagram illustrating processing of a PCIe-BUS access tracing unit.

FIG. 14 is a diagram illustrating processing by the PCIe-BUS access tracing unit.

The PCIe-BUS access tracing unit 163 performs serial-parallel conversion of the bus tracing target signals of the PCIe controller 182-M, PCIe #0 in the D-FF (delay flip-flop) (not illustrated) within the access monitoring unit 161, and then latches the signals (step S601).

The bus tracing target signals are as follows: event occurrence time, P_I/O_read: PCIe I/O access read, P_I/O_write: PCIe I/O access write, P_INT: PCIe interrupt sequence, P_MEM_Read: PCIe memory read, P_MEM_Write: PCIe memory write, P_Cnf_Read: PCIe configuration space read, P_Cnf_Write: PCIe configuration space write, P_Address33_00: transmission/reception address 33 to 00 bit, P_Data63_00: transmission/reception data 63 to 00 bit, P_Req_ACK: PCIe bus request/occupation permission, REQ#M: memory access request via PCIe #M, and ACK#M: access permission signal The PCIe-BUS access tracing unit 163 writes latched data into the memory 168 via FIFO (step S602).

The CPU 162 sorts data stored in the memory 168, and calculates statistical information (step S603).

The CPU 162 records saved data from the memory 168 to the NVM 166 (step S604).

Figure 15:
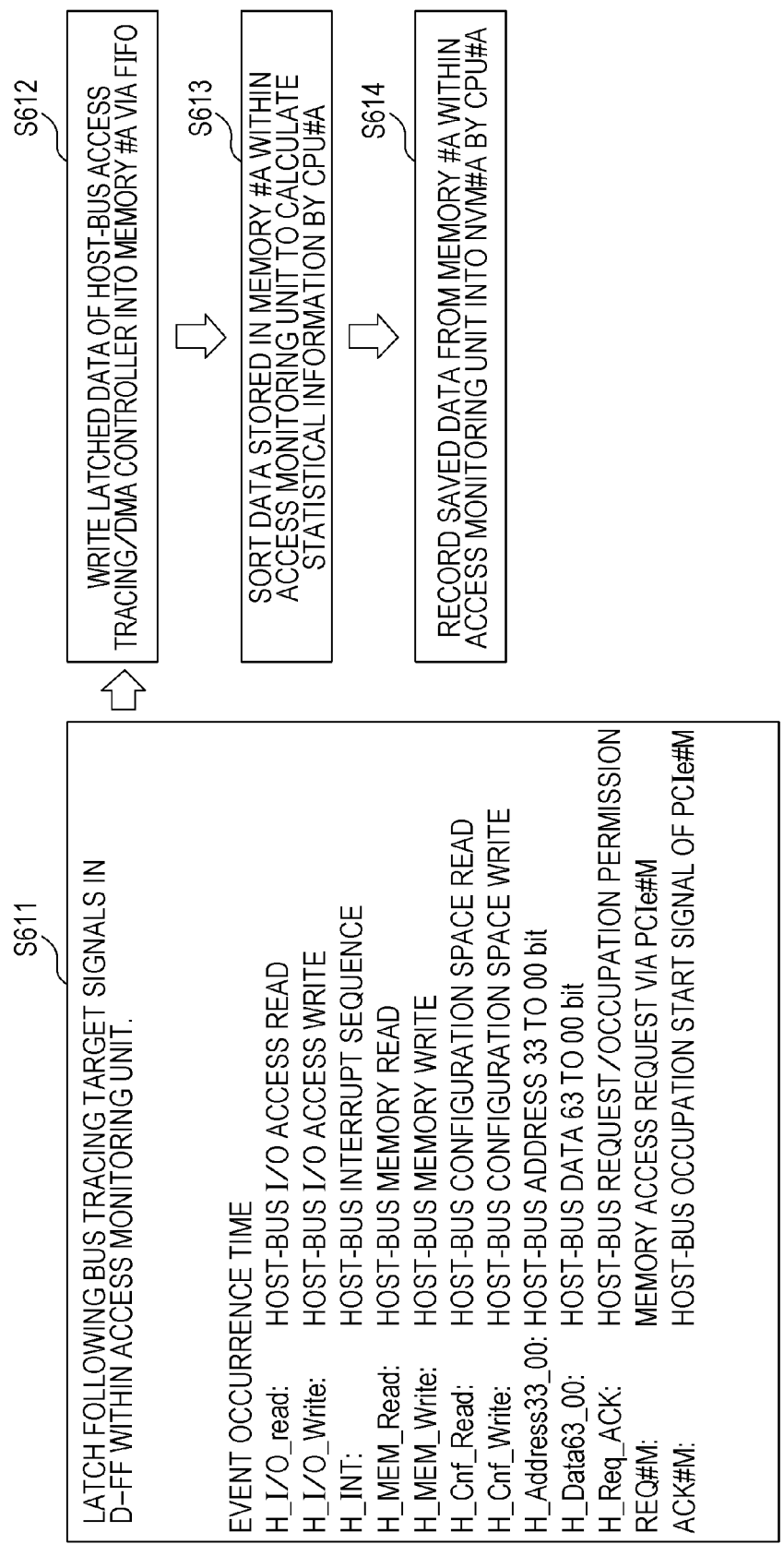
FIG. 15 is a diagram illustrating processing of a HOST-BUS access tracing/DMA controller.

FIG. 15 is a diagram illustrating processing of the HOST-BUS access tracing/DMA controller.

The HOST-BUS access tracing/DMA controller 165 latches a D-FF (not illustrated) bus tracing target signal in the access monitoring unit 161 (step S601).

The bus tracing signals are as follows: event occurrence time, H_I/O_read: Host bus I/O access read, H_I/O_Write: Host bus I/O access write, H_INT: Host bus interrupt sequence, H_MEM_Read: Host bus memory read, H_MEM_Write: Host bus memory write, H_Cnf_Read: Host bus configuration space read, H_Cnf_Write: Host bus configuration space write, H_Address33_00: Host bus address 33 to 00 bit, H_Data63_00: Host bus data 63 to 00 bit, H_Req_ACK, Host bus request/occupation permission, REQ#N: memory access request via PCIe #N, and ACK#N: Host bus occupation starting signal of PCIe #N The HOST-BUS access tracing/DMA controller 165 writes latched data into the memory 168 via FIFO (step S612).

The CPU 162 sorts data stored in the memory 168, and calculates statistical information (step S613).

The CPU 162 records saved data from the memory 168 to the NVM 166 (step S614).

Figure 16:
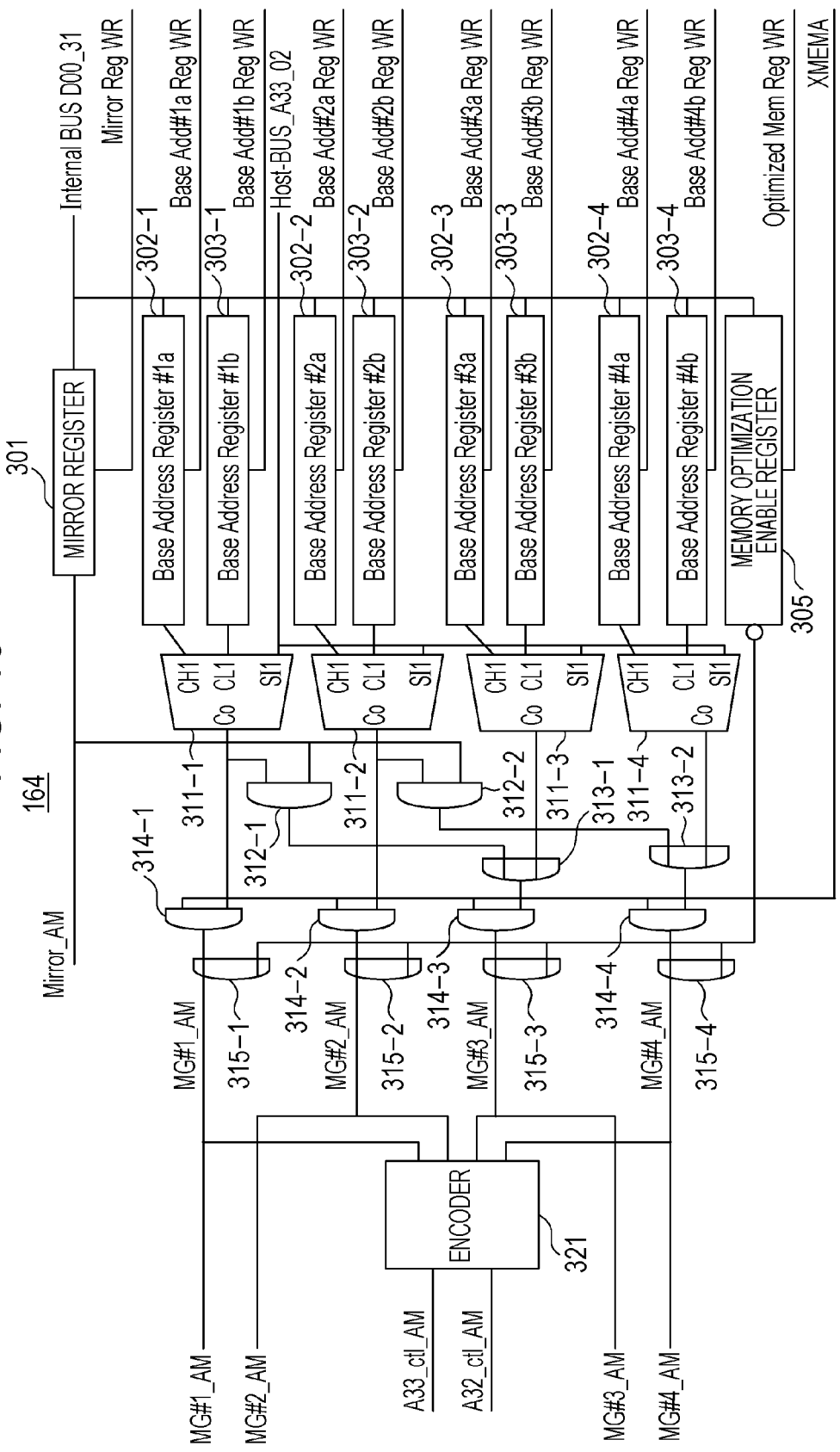
FIG. 16 is a diagram illustrating a configuration of an address translation controller.

FIG. 16 is a diagram illustrating the configuration of the address translation controller.

The address translation controller 164 includes a mirror register 301, base address registers 302-N, base address registers 303-N, a memory optimization enable register 305, comparators 311-N, AND circuits 312-1, 312-2, 314-N, OR circuits 313-1, 313-2, 315-N, and a decoder 321.

The mirror register 301, the base address registers 302-N, the base address registers 303-N, and the memory optimization enable register 305 receive internal bus data D00 to 31.

The mirror register 301 stores information indicating whether to perform memory mirroring. When memory mirroring is performed, the value stored by the mirror register 301 is 1. The mirror register 301 receives a write control signal Mirror Reg WR. The mirror register 301 writes internal bus data D00 to 31 to the mirror register 301 in response to the write control signal Mirror Reg WR.

The base address register 302-N stores starting addresses A33 to A2 of the area in which memory swap is performed. A33 to A2 is address data of higher-order 32 bits out of 34-bit memory address shown by A33 to A0. The base address register 302-N receives a write control signal Base Add#Na Reg WR. The base address register 302-N writes internal bus data D00 to 31 to the base address register 302-N in response to the write control signal Base Add#Na Reg WR.

The base address register 303-N stores the ending addresses A33 to A2 of the area in which memory swap is performed. The base address register 303-N receives the write control signal Base Add#Nb Reg WR. The base address register 303-N writes internal bus data D00 to 31 to the base address register 303-N in response to the write control signal Base Add#Nb Reg WR.

In the following description and drawings, the base address register 302-N may be referred to as the base address register #Na, and the base address register 303-N may be referred to as the base address register #Nb.

The memory optimization enable register 305 stores information indicating whether to perform memory optimization. When memory optimization is performed, the value stored by the memory optimization enable register 305 is 1. The memory optimization enable register 305 receives a write control signal Optimized Mem Reg WR. The memory optimization enable register 305 writes internal bus data D00 to 31 to the memory optimization enable register 305 in response to the write control signal Optimized Mem Reg WR.

The comparator 311-N receives the base address register 302-N, the base address register 303-N, and the HOST BUS_A33_02, and outputs comparison results based on the base address register 302-N, the base address register 303-N, and the HOST BUS_A33_02. Assume input from the base address register 302-N as CH1, input from the base address register 303-N as CL1, and HOST BUS_A33_02 as S11. Assume output of the comparator 311-N as Co.

Relationship between input and output of the comparator 311-N is as per the truth table illustrated in FIG. 17.
When SL1<CH1, output Co=0.
When SL1>CL1, output Co=0.
When CH1≤SL1≤CL1, output Co=1.

The AND circuit 312-1 receives output of the comparator 311-1, and output of the base address register 302-1, and outputs a logical product between output of the comparator 311-1, and output of the base address register 302-1.

The AND circuit 312-2 receives output of the comparator 311-2, and output of the base address register 302-1, and outputs a logical product between output of the comparator 311-2, and output of the base address register 302-1.

The OR circuit 313-1 receives output of the AND circuit 312-1, and output of the comparator 311-1, and outputs a logical sum of output of the AND circuit 312-1, and output of the comparator 311-3.

The OR circuit 313-2 receives output of the AND circuit 312-2, and output of the comparator 311-4, and outputs a logical sum of output of the AND circuit 312-2, and output of the comparator 311-4.

The AND circuit 314-N receives XMEMA and output of the comparator 311-N, and outputs a logical product between XMEMA and output of the comparator 311-1.

The OR circuit 315-N receives output of the AND circuit 314-N, and an inverted value of the memory optimization enable register 305, and outputs a logical sum of output of the AND circuit 314-N and the inverted value of the memory optimization enable register 305. Output of the OR circuit 315-N is referred to as MG#N_AM.

The encoder 321 receives output MG#N_AM of the OR circuit 315-N. Based on input MG#N_AM, the encoder 321 outputs A33_ctl_AM, A32_ctl_AM as the output signal.

Relationship between input and output of the encoder 321 is as per the truth table illustrated in FIG. 18.
When (MG#1AM, MG#2_AM, MG#3_AM, MG#4_AM)=(0, 1, 1, 1), (A33_ctl_AM, A32_ctl_AM)=(0, 0).
When (MG#1AM, MG#2_AM, MG#3_AM, MG#4_AM)=(1, 0, 1, 1), (A33_ctl_AM, A32_ctl_AM)=(0, 1).
When (MG#1AM, MG#2_AM, MG#3_AM, MG#4_AM)=(1, 1, 0, 1), (A33_ctl_AM, A32_ctl_AM)=(1, 0).
When (MG#1AM, MG#2_AM, MG#3_AM, MG#4_AM)=(1, 1, 1, 0), (A33_ctl_AM, A32_ctl_AM)=(1, 1).
When (MG#1AM, MG#2_AM, MG#3_AM, MG#4_AM)=(1, 1, 1, 1), (A33_ctl_AM, A32_ctl_AM)=(1, 1).

Here, configuration of the address translation controller for performing the memory mapping of a first example illustrated in FIGS. 2A and 2B.

For the memory space B of the graphic card 241, the access area is swapped from the memory #1 to the memory #3.

Head addresses A33 to A2 of the memory area in the logical address memory space of the graphic card 241 are set to the base address register 302-3, and last addresses A33 to A2 thereof are set to the base address register 303-3.

Head addresses A33 to A2 of the swap destination memory area of the graphic card 241 are set to the base address register 302-1, and last addresses A33 to A2 thereof are set to the base address register 303-1.

The memory space C of the RAID card 211 remains the memory #2 without change.

For the memory space D of the LAN card 221, the access area is swapped from the memory #2 to the memory #4.

Head addresses A33 to A2 of the logical address memory space of the memory space D of the LAN card 221 are set to the base address register 302-4, and last addresses A33 to A2 thereof are set to the base address register 303-4.

Head addresses A33 to A2 of the swap destination memory area of the LAN card 221 are set to the base address register 302-2, and last addresses A33 to A2 thereof are set to the base address register 303-2.

Thus, memory mapping recognized by the CPU #1 is a CPU access logical memory space illustrated in FIGS. 2A and 2B. The MPX unit 151 may be configured such that physical memory access to a memory space becomes a memory space on a physical memory. Thus, optimization without conflict access becomes possible.

Figure 19:
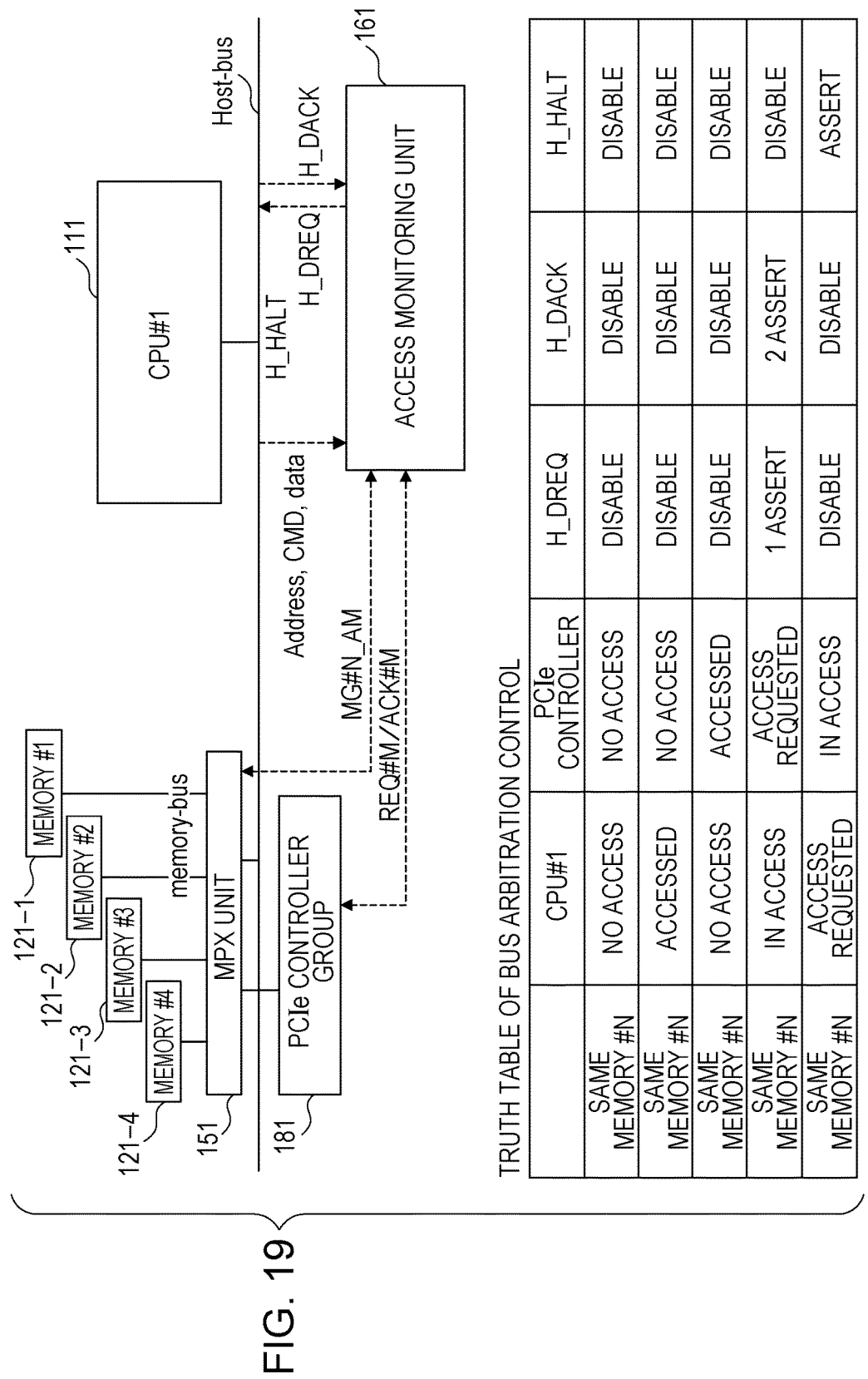
FIG. 19 is a diagram illustrating bus arbitration control.
Figure 20A:
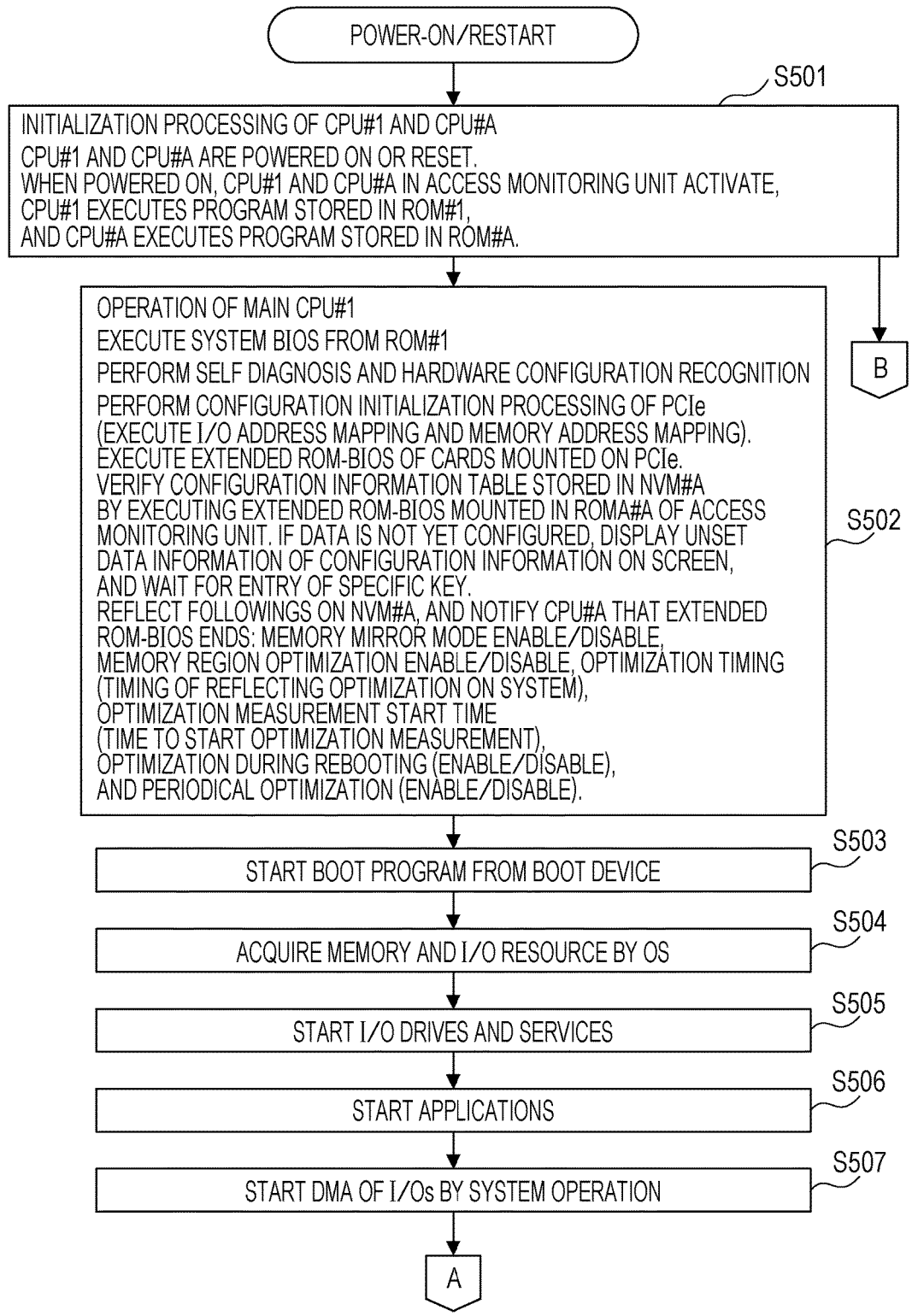
Figure 20C:
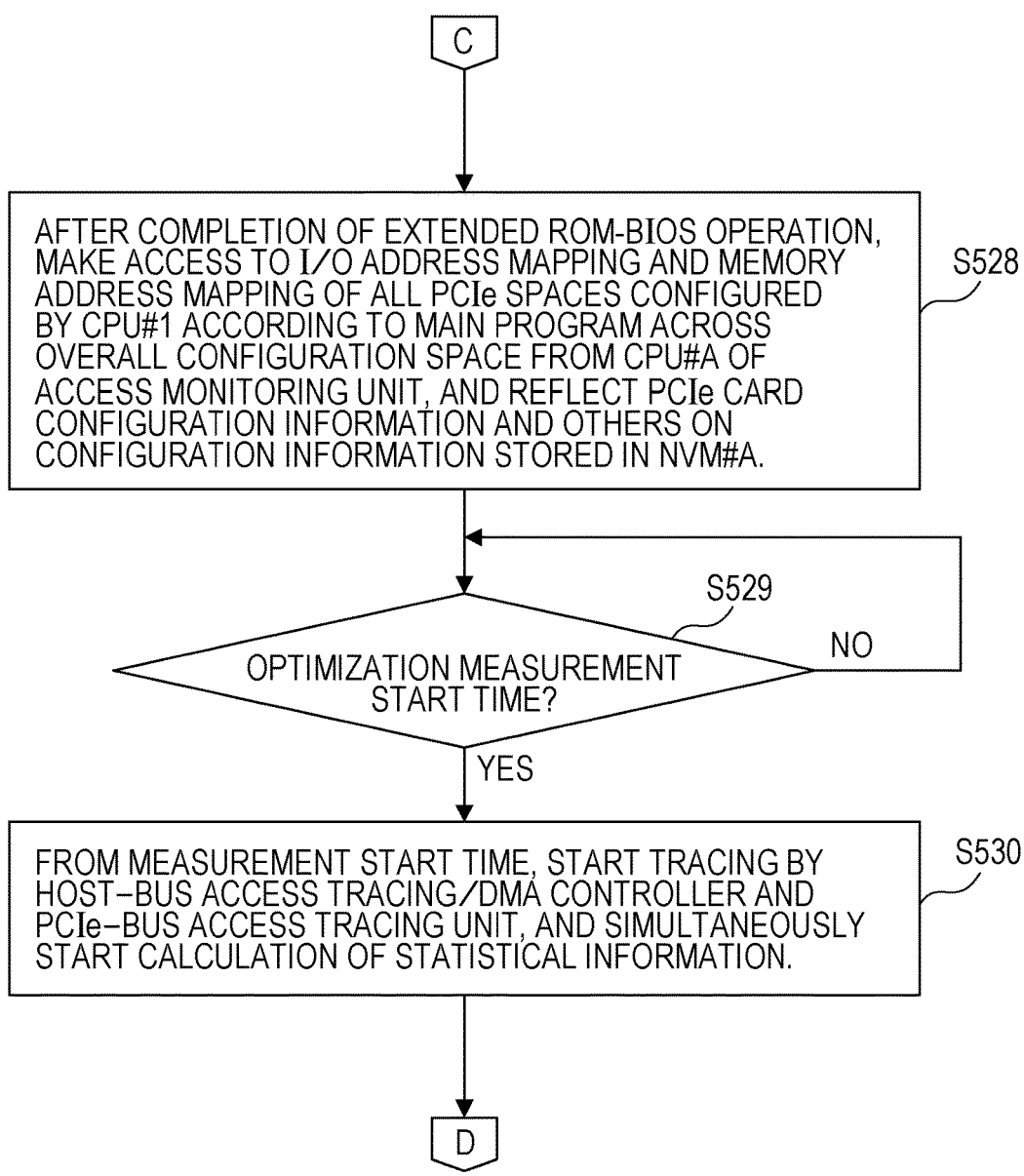
Figure 20D:
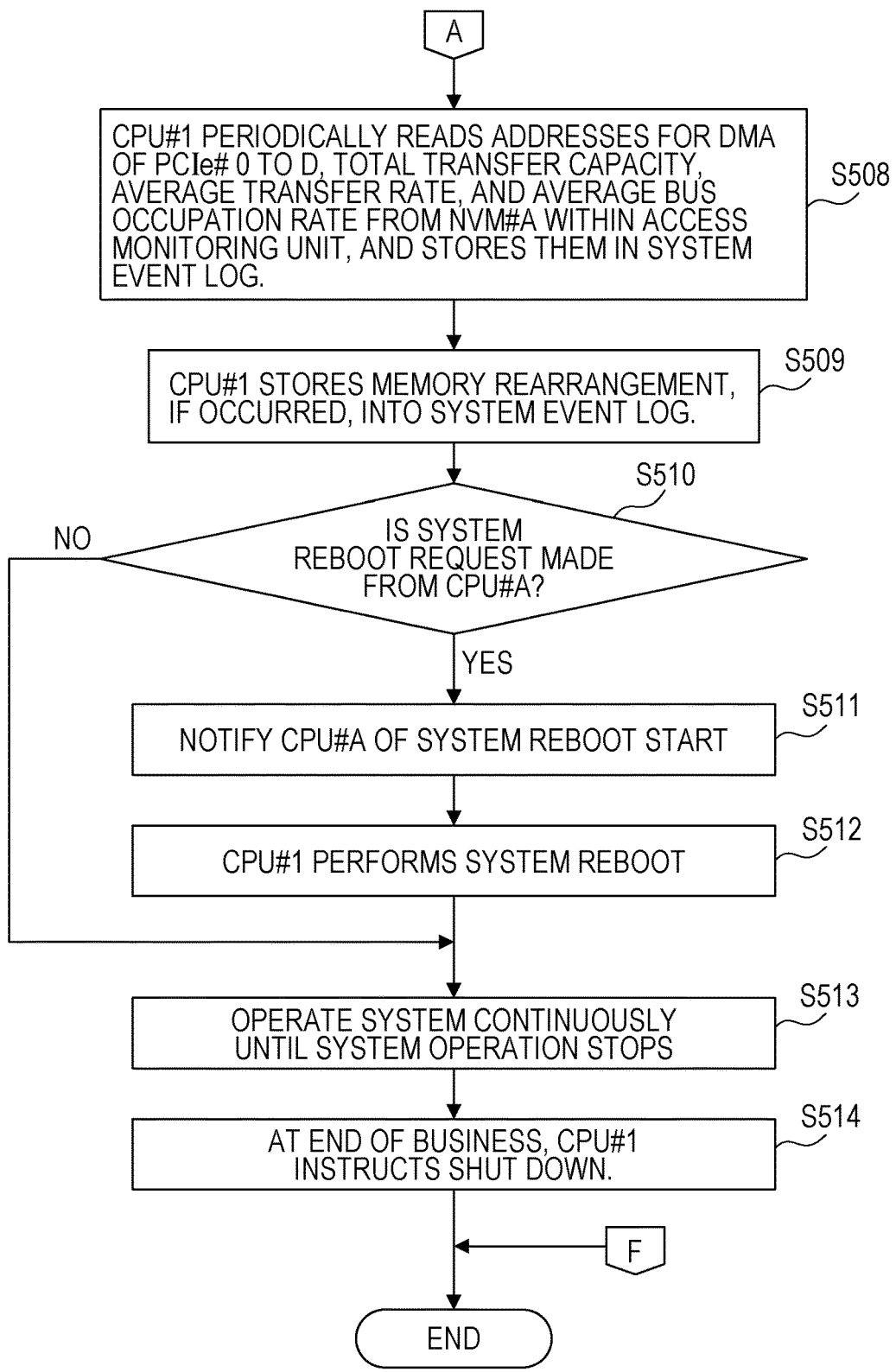
Figure 20E:
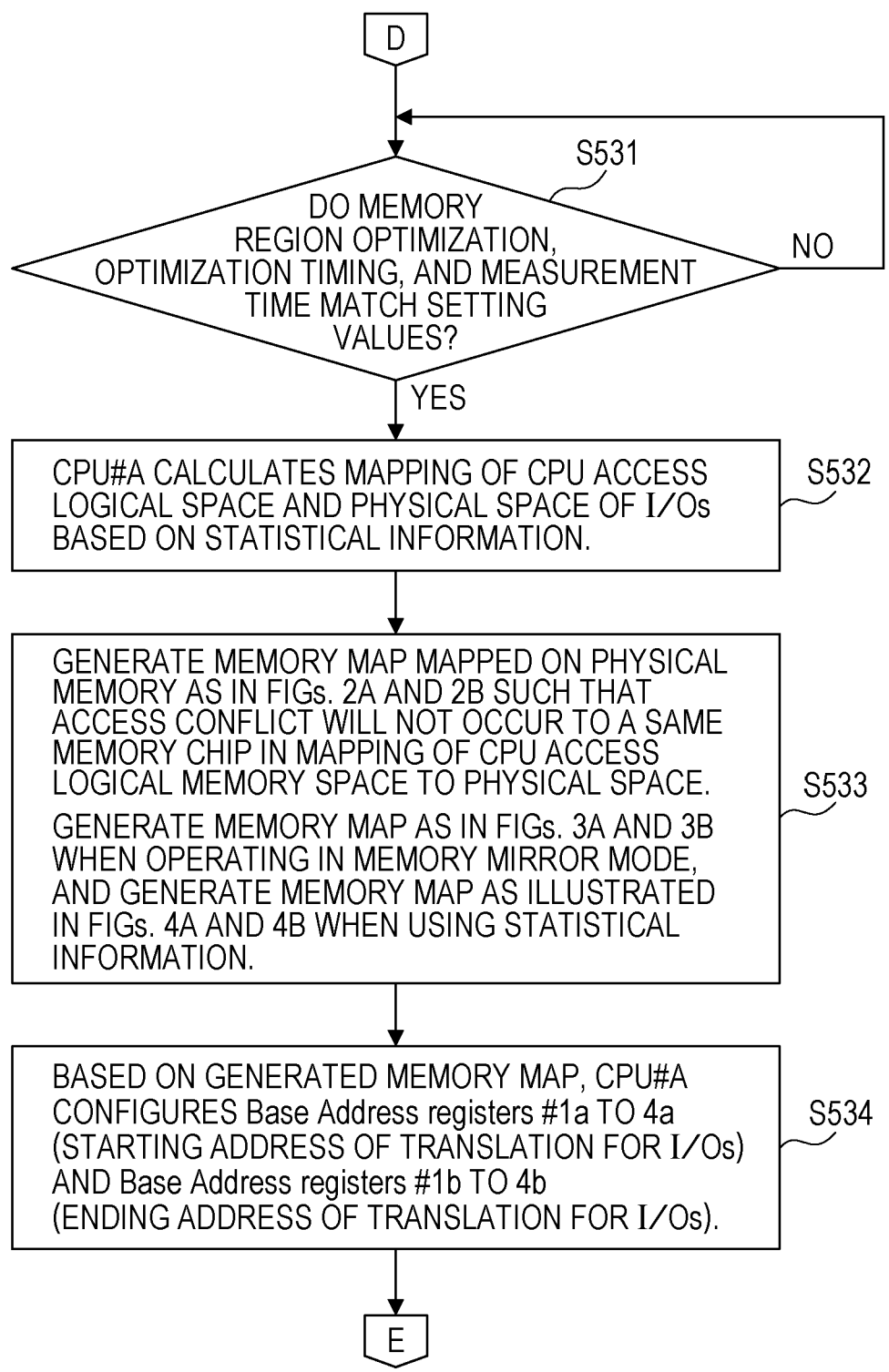
Figure 20F:
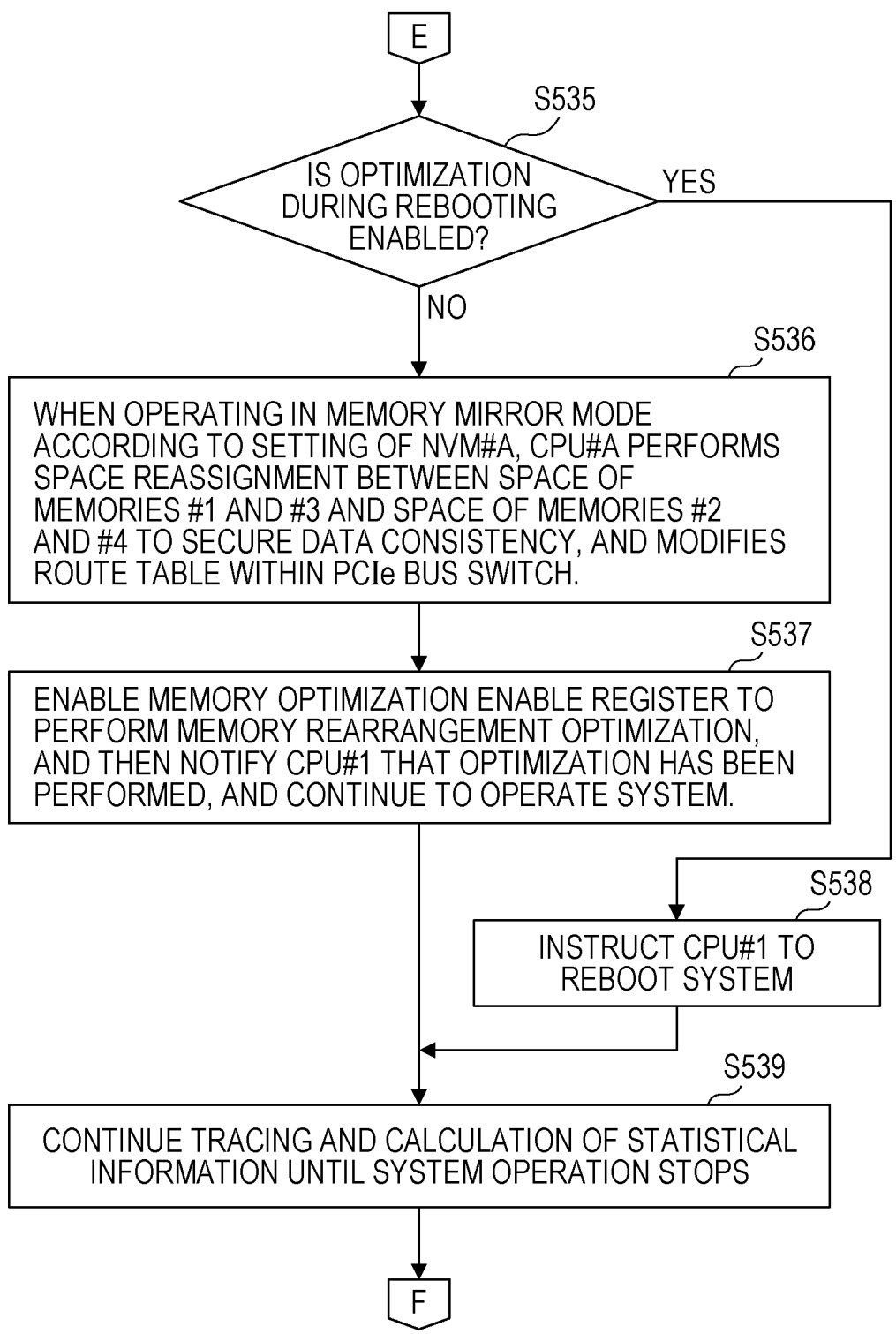

FIG. 19 is a diagram illustrating bus arbitration control.

When the CPU #1 makes access to a memory assigned to the PCIe controller 182-M, an access conflict occurs.

To avoid the access conflict, access priority control has to be performed. In the case where, when the PCIe controller 182-M makes access to one of the memories #1 to 4, the CPU makes access to the memory of the same number, the simultaneous access is inhibited by the HOST-BUS access tracing/DMA controller 165 of the access monitoring unit 161.

Similarly, in the case where, when the CPU #1 makes access to one of the memories #1 to 4, the PCIe controller 182-M makes access to the memory of the same number, the access is inhibited by the access monitoring unit.

For this reason, the HOST-BUS access tracing/DMA controller 165 monitors access from the CPU #1, and when the CPU #1 makes access, monitors the state of the Host-bus, and when a same memory is accessed by the PCIe controller 182-M, delays access until access by the CPU #1 completes and simultaneously outputs the Host-bus occupation request signal H DREQ to the CPU #1. When the bus becomes ready for release, the CPU #1 outputs the occupation permission signal H_DACK, and the PCIe controller 182-M makes access to a target memory space. Output of H DREQ is stopped upon completion of the access.

When the CPU #1 makes access to a memory number, among memories #1 to 4, same as the memory number which is being accessed by the PCIe controller 182-M, the access monitoring unit sends the H HALT signal to the CPU #1 to put the CPU #1 in the temporary hold state, and upon completion of the access by the PCIe controller 182-M, releases the halt signal H_HALT to resume access of the CPU #1.

A lower part of FIG. 19 indicates a truth table of the bus arbitration control.

When there is no access to a same memory by the CPU #1 and the PCIe controller, H_DREQ is disabled (=0), H_DACK is disabled (=0), and H_HALT is disabled (=0).

When there is an access to a same memory by the CPU #1 but not by the PCIe controller, H_DREQ is disabled (=0), H_DACK is disabled (=0), and H_HALT is disabled (=0).

When there is no access to a same memory by the CPU #1 but the PCIe controller, H_DREQ is disabled (=0), H_DACK is disabled (=0), and H_HALT is disabled (=0).

When a same memory is in access by the CPU #1 and access thereto is requested by the PCIe controller, H_DREQ is asserted (=1), and H_DACK is asserted (=1) after completion of access by the CPU #1. H_HALT is disabled (=0).

When a same memory is in access by the PCIe controller and access thereto is requested by the CPU #1, H_DREQ is disabled (=0), H_DACK is disabled (=0), and H_HALT is asserted (=1).

FIG. 20A to FIG. 20F are flowcharts of the bus control method according to the embodiment.

At step S501, CPU 111 and CPU 162 are powered on or restarted. Then, the main CPU 111 and the CPU 162 in the access monitoring unit activate, and the CPU 111 reads and executes a program stored in ROM #1, and the CPU 162 reads and executes a program stored in ROM #A (initialization processing of CPU 111/CPU 162).

Hereinafter, steps S502 to S514 and steps S521 to S538 are executed in parallel.

At the step S502, the CPU 111 executes system BIOS by reading from ROM #1. Thus, the CPU 111 performs self-diagnosis and hardware configuration recognition. The CPU 111 performs configuration initialization processing of PCIe (I/O address mapping and memory address mapping).

The CPU 111 executes extended ROMBIOS of cards mounted on PCIe. The CPU 111 causes the extended ROM-BIOS stored in the ROM 167 of the access monitoring unit 161 to verify configuration information stored in the NVM 166, and when data is not set, displays unset data information of the configuration information on a screen and waits for entry of a specific key.

The CPU 111 reflects, on the NVM 166, memory mirror mode enable/disable, memory area optimization enable/disable, optimization timing, time for reflecting optimization on the system, optimization measurement start time, optimization measurement start time, per-rebooting optimization reflection enable/disable, and periodical time optimization enable/disable, and notifies the CPU 162 that the extended ROMBIOS has ended.

At the step S503, the CPU 111 starts a program for booting the OS from a boot device.

At the step S504, the CPU 111 acquires memory and I/O resource by OS.

At the step S505, the CPU 111 activates I/O drivers and services.

At the step S506, the CPU 111 activates applications installed in the information processing apparatus 101.

At the step S507, DMA by I/Os starts by system operation.

At the step S508, the CPU 111 periodically reads addresses used for DMA of PCIe #0 to D, total transfer capacity, average transfer rate, and average bus occupation ratio from the NVM 166 in the access monitoring unit 161, and stores in the system event log.

At the step S509, the CPU 111 stores memory rearrangement, if occurred, into the system event log.

At the step S510, the CPU 111 determines whether there is system reboot request from the CPU 162. If there is system reboot request, control proceeds to the step S511, and if there is no system reboot request, control proceeds to the step S513.

At the step S511, the CPU 111 notifies system reboot start to the CPU 162.

At the step S512, the CPU 111 executes system reboot. At the step S513, the CPU 111 operates the system continuously until system operation stop.

At the step S514, the CPU 111 instructs shutdown at the end of business.

At the step S521, the CPU 162 reads and executes a program stored in the ROM 167 to perform self-diagnosis of the access monitoring unit, hardware configuration recognition, and verification of contents of the configuration information table stored in the NVM #A before start-up.

At the step S522, the CPU 162 determines whether the configuration information (FIGS. 13A, 13B) has been configured. If the configuration information has been configured, control proceeds to the step S523, and if not configured, control proceeds to the step S527.

At the step S523, the CPU 162 determines with reference to the configuration information whether optimization during rebooting is enabled.

At the step S524, when optimization during rebooting is enabled, the CPU 162 changes registers of the address translation controller 164 and the route table of the PCIe bus switch 191 to optimum values.

At the step S525, the CPU 162 determines with reference to the configuration information whether memory mirror mode is enabled. When the memory mirror mode is enabled, control proceeds to the step S526, and when the memory mirror mode is disabled, control proceeds to the step S527.

At the step S526, the CPU 162 causes the mirror register 301 of the address translation controller 164 to enable the memory mirror signal Mirror_AM, and puts the information processing apparatus 101 in the memory mirror mode. With this configuration, the MAC 131 and the address translator 141 are configured with mirroring between memories #1 and #3 and between memories #2 and #4, a memory space of memories #1 and #2 and a memory space of memories #3 and # are arranged in a same space respectively, and write into the memory #1 is in a same space of the memory #3, and write into the memory #2 is in a same space of the memory #4.

At the step S527, the CPU 162 determines whether processing of the extended ROMBIOS has ended. If the extended ROMBIOS has ended, control proceeds to the step S528. Whether or not processing of the extended ROMBIOS has ended is determined, for example, by a notification from the CPU 111.

At the step S528, after completion of the extended ROMBIOS operation, the CPU 162 makes access to the I/O address mapping and the memory address mapping of all PCIe spaces configured by the CPU 111 according to the main program across overall configuration space from the CPU 162 of the access monitoring unit 161, and reflects PCIe card configuration information and the like on the configuration information stored in the NVM 166.

At the step S529, the CPU 162 checks with reference to the configuration information whether current time is the optimization measurement start time. If the current time is the optimization measurement start time, control proceeds to the step S530.

At the step S530, the CPU 162 causes the HOST-BUS access tracing/DMA controller 165 and the PCIe-BUS access tracing unit 163 to start tracing from the optimization measurement start time, and simultaneously starts calculation of the statistical information.

At the step S531, the CPU 162 determines with reference to the configuration information whether memory area optimization, optimization timing, and measurement time are identical with the setting values. If identical, control proceeds to the step S531, and if not identical, control waits until those become identical with the setting values.

At the step S532, if memory optimization is performed based on the statistical information, the CPU 162 calculates a mapping of the CPU access logical space and physical space of I/O devices based on the statistical information. The method of calculating the mapping of the CPU access logical space and physical space is as illustrated in FIG. 4A and FIG. 4B. If memory optimization is not performed based on the statistical information, the step S532 may be omitted.

At the step S533, the CPU 162 generates a memory map on the physical space such that access conflict does not occur to a same memory 121-M when mapped from the CPU access logical memory space to the physical space. The generated memory map is, for example, as illustrated in FIGS. 2A and 2B. When operating in the memory mirror mode, the CPU 162 generates a memory map as illustrated in FIGS. 3A and 3B, and when using the statistical information, the CPU 162 generates a memory map as illustrated in FIGS. 4A and 4B. The CPU 162 also generates a memory space table indicating the generated memory map, and stores in the NVM 166.

At the step S534, based on the generated memory map, the CPU 162 configures base address registers 302-1 to 302-4 (starting addresses of altered memory area of I/Os) and base address registers 303-1 to 303-4 (ending addresses of altered memory area of I/Os).

At the step S535, the CPU 162 determines with reference to the configuration information whether optimization during rebooting is enabled. If enabled, control proceeds to the step S537, and if not enabled, control proceeds to the step S536.

At the step S536, when operating in the memory mirror mode according to the setting of the NVM 166, the CPU 162 performs space reassignment between a space of memories #1 and #3 and a space of memories #2 and #4 to secure data consistency, and modifies a route table within the PCIe bus switch 191.

At the step S537, the CPU 162 enables the memory optimization enable register 305 to perform memory rearrangement optimization, then notifies the CPU 111 that optimization has been performed, and continues to operate the system.

At the step S538, the CPU 162 instructs the CPU 111 to reboot the system.

At the step S539, the CPU 162 continues calculation of trace/statistical information until system operation stop.

FIG. 21 is a diagram illustrating a conventional use status of the memory bus, and a use status of the memory bus optimized according to the embodiment.

An upper part of FIG. 21 illustrates a conventional use status of the memory bus, and a lower part of FIG. 21 illustrates use status of the memory bus optimized according to the embodiment.

In a conventional information processing apparatus, CPUs and PCIe devices PCIe #1 to PCIe #4 make access to a memory through a memory bus via a host bus. Therefore, due to bus conflict, only one device can use the host bus in each cycle. As illustrated in the upper part of FIG. 21, the CPU uses the memory bus #1 via the host bus in the cycle #1, and the PCIe device PCIe #1 uses the memory bus #2 via the host bus in the cycle #2. Similarly, in cycles #3 to #6, only one device use a memory bus.

On the other hand, in the information processing apparatus according to the embodiment, PCIe devices PCIe #1 to PCIe #4 can make access to an associated memory by connecting to an associated memory bus via an independent bus, but not via the host bus. As illustrated at the lower part of FIG. 21, in the cycle #1, the CPU uses the memory bus #1, the PCIe #2 uses the memory bus #2, and the PCIe #4 uses the memory bus #4, respectively. Similarly, in cycles #2 to #6, multiple devices use memory buses different from each other. In such a manner, in the information processing apparatus according to the embodiment, different devices can use different memory buses (can make access to different memories) in a same cycle.

Thus, the information processing apparatus according to the embodiment is capable of suppressing performance deterioration due to a bus conflict.

The embodiment is summarized hereunder.

To optimize the performance, it is important to reduce conflicts in access frequency between the CPU and the memory and data transfer from I/O devices to the memory. To solve this problem, the information processing apparatus 101 according to the embodiment includes direct access paths comprising independent buses to memory areas for I/O devices in which a bus access conflict may occur during data transfer. The access monitoring unit 161 alters mapping from a memory access space of the CPU 111 to a physical address memory space through the MPX unit 151 such that a memory address area actually used by the CPU is changed to an area in which simultaneous accesses between CPU/memories and between I/O devices/memories are available. Use of the independent access routes for I/O devices/memories allows an I/O device to access to a memory simultaneously while the CPU or another I/O device is occupying the host bus, and thereby suppresses performance deterioration due to an access conflict in the bus.

Specifically, an I/O space and a memory space assigned by BIOS to each device, and an I/O area and a memory area assigned to each of I/O devices by OS are saved as a memory space table in the NVM 166 within the access monitoring unit 161, and the memory space table stores statistical information of access for each of the I/O devices. Then, a memory mapping table using the memory access ranges dividable by the buses is created such that devices having high possibility of access conflict may not access the same memory bus. Then, after starting the OS, the information processing apparatus 101 performs the memory addresses assignment with low possibility of conflicts to the memory modules.

The access monitoring unit 161 monitors the host bus, and performs address translation control to assign the actually used memory access space of the CPU 111 and the DMA memory space used by an I/O arranged in each of PCIes, to respective memory modules.

In the initial state prior to optimization, when memory mirror function is enabled by the access monitoring unit, memory access is performed with the memory mirror configured between the memories #1 and t#3, and between the memories #2 and #4 respectively, and write to the memory #1 is written into a same space as the memory #3, and write to the memory #2 is written into a same space as the memory #4.

The access monitoring unit 161 monitors memory access from the CPU 111 via the host bus, I/O access, DMA from I/O, type of the I/O device, frequency of DMA request from I/O, ratio of BUS conflict, occupation time, and real time performance.

Data of monitored information is accumulated in the NVM 166 as statistical information. A threshold of the monitoring time or transaction amount is set in the configuration information in advance. When the value is beyond the threshold, the memory space table of FIG. 4A is generated based on the statistical information. Then, the starting address of a memory space having many access conflicts to which I/Os make access is set at the base address register #Na of FIG. 16, and the ending address is set at the base address register #Nb. Then, the configuration information is set on the NVM 166.

To enable direct access to a mapped address space, the access monitoring unit 161 sets the PCIe bus switch 191 via PCIe such that the corresponding I/O makes access to a DMA space on the endpoint-to-endpoint basis, and transmits the packet to PCIe controllers 182-N to memories 121-N in a corresponding manner from an address at the header of the packet sent from the endpoint, but without receiving a direction from the PCIe controller 171 (root complex). According to the embodiment, there are four endpoint-to-endpoint access paths. Therefore, maximum four memories can be accessed simultaneously. Also, simultaneous access path can be secured easily by adding an access path.

When an access conflict occurs in a memory 121-N same as a memory access from the CPU 111 via the host bus, conflict determination is performed by the bus arbitration control illustrated in FIG. 19 to execute the access.

When a hardware configuration (configuration of the memory, CUP type, and mounted I/O, and so on) or an application is added or modified, there is a change in the number of transactions due to a change in the number of users, or there is a change in the operating environment, the information processing apparatus according to the embodiment is capable of automatically optimizing system performance by: monitoring the memory bus and I/O buses operated by the system by means of the access monitoring unit based on the installed application and the operation mode (installation environment, concentration of operation time, real time performance, and so on); and performing memory mapping such that memory accesses which become a bottleneck are optimized, without monitoring the performance through actual system verification and changing a setting value for access inhibition or the like to consider the bus occupation rate by the application of the benchmark software. Redundantly arranged memory chips and a control mechanism of dedicated buses enable dynamic mapping of the memory access routes during operation.

The information processing apparatus according to the embodiment detects a performance bottleneck during actual operation without actual system verification, and makes it possible to build up a system having optimum performance according to operating conditions just by re-starting or re-powering-on of the apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. An information processing apparatus comprising:
a plurality of memories;
a plurality of buses each connected to each of the memories;
an input/output device configured to make access to the plurality of memories;
a processor coupled to the plurality of memories and configured to execute a process comprising;
collecting information regarding usage status of the buses themselves used by the input/output device for accessing the memories, and altering, based on the collected information, a mapping of a logical address and a physical address of a memory area used by the input/output device; and a bus switch to store a route table and configured to perform access routing from the input/output device to any one of the plurality of buses based on the mapping.

2. The information processing apparatus according to claim 1, wherein the processing unit alters the mapping based on at least one of occupation ratios of the plurality of buses by the input/output device, fluctuations of the occupation ratios, and an average transfer rate of the input/output device.

3. The information processing apparatus according to claim 1, wherein the processing unit alters the mapping such that a memory area used by the input/output device and another memory area used by another input/output device are assigned respectively to different ones of the plurality of memories.

4. A bus control method implemented by an information processing apparatus including a plurality of memories, a plurality of buses each connected to each of the memories, and an input/output device configured to make access to the plurality of memories, the bus control method comprising:

collecting information regarding usage status of the buses themselves used by the input/output device for accessing the memories;

altering, based on the collected information, a mapping of a logical address and a physical address of a memory area used by the input/output device; and performing access routing from the input/output device to any one of the plurality of buses based on the mapping stored in a route table.

5. The bus control method according to claim 4, wherein the altering includes altering the mapping based on at least one of occupation ratios of the plurality of buses by the input/output device, fluctuations of the occupation ratios, and an average transfer rate of the input/output device.

6. The bus control method according to claim 4, wherein the processing unit alters the mapping such that a memory area used by the input/output device and another memory area used by another input/output device are assigned respectively to different ones of the plurality of memories.

* * * * *